US012542632B2

(12) United States Patent
Takeda et al.

(10) Patent No.: US 12,542,632 B2
(45) Date of Patent: Feb. 3, 2026

(54) DYNAMIC UPLINK CONTROL CHANNEL GROUPING

(71) Applicant: QUALCOMM Incorporated, San Diego, CA (US)

(72) Inventors: Kazuki Takeda, Minato-ku (JP); Heechoon Lee, San Diego, CA (US); Jae Ho Ryu, San Diego, CA (US); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 18/455,453

(22) Filed: Aug. 24, 2023

(65) Prior Publication Data

US 2024/0106587 A1    Mar. 28, 2024

Related U.S. Application Data

(60) Provisional application No. 63/410,458, filed on Sep. 27, 2022.

(51) Int. Cl.
*H04W 4/00* (2018.01)
*H04L 5/00* (2006.01)
*H04W 72/21* (2023.01)
*H04W 72/23* (2023.01)

(52) U.S. Cl.
CPC .......... *H04L 5/0042* (2013.01); *H04L 5/0094* (2013.01); *H04W 72/21* (2023.01); *H04W 72/23* (2023.01)

(58) Field of Classification Search
CPC ... H04W 72/21; H04W 72/23; H04W 5/0042; H04W 5/0094
See application file for complete search history.

(56) References Cited

U.S. PATENT DOCUMENTS

| 12,137,457 | B2 * | 11/2024 | Uchino | H04L 5/0098 |
| 2019/0327779 | A1 * | 10/2019 | Lee | H04W 76/15 |
| 2021/0111780 | A1 * | 4/2021 | Zhou | H04B 7/06964 |
| 2021/0111835 | A1 * | 4/2021 | Khoshnevisan | H04W 72/02 |

(Continued)

OTHER PUBLICATIONS

International Search Report and Written Opinion—PCT/US2023/072952—ISA/EPO—Nov. 30, 2023.

(Continued)

*Primary Examiner* — Abdelnabi O Musa
(74) *Attorney, Agent, or Firm* — Holland & Hart LLP

(57) ABSTRACT

Methods, systems, and devices for wireless communications are described. Some wireless communications systems may support dynamic uplink control channel grouping. For example, a user equipment (UE) may receive control signaling indicating multiple uplink control channel groups for the UE, where each uplink control channel group of the multiple uplink control channel groups is associated with a different set of uplink control channel resources. Additionally, the UE may select an uplink control channel group for a component carrier (CC) associated with the UE, where the uplink control channel group is selected in accordance with a detected trigger at the UE. Further, the UE may transmit uplink control information for the CC in accordance with the selected uplink control channel group.

30 Claims, 16 Drawing Sheets

(56) References Cited

U.S. PATENT DOCUMENTS

| | | | |
|---|---|---|---|
| 2021/0227458 A1* | 7/2021 | Khoshnevisan | H04L 5/001 |
| 2022/0109528 A1* | 4/2022 | Babaei | H04W 72/04 |
| 2023/0284229 A1* | 9/2023 | Dinan | H04W 72/52 |
| | | | 370/329 |
| 2025/0088316 A1* | 3/2025 | Huang | H04W 72/11 |

OTHER PUBLICATIONS

Mediatek Inc: "On UE Feedback Enhancements for HARQ-ARK", 3GPP Draft, 3GPP TSG RAN WG1 Meeting #104-e, R1-2100574, 3rd Generation Partnership Project 3GPP), Mobile Competence Centre, 650, Route Des Lucioles, F-06921 Sophia-antipolis Cedex ; France vol. RAN WG1, No. e-Meeting, Feb. 5, 2021-Feb. 5, 2021 Jan. 19, 2021, XP051971045, e-Meeting, Jan. 25-Feb. 5, 2021, 19 Pages.

* cited by examiner

DYNAMIC UPLINK CONTROL CHANNEL GROUPING

CROSS REFERENCE

The present Application for Patent claims the benefit of U.S. Provisional Patent Application No. 63/410,458 by TAKEDA et al., entitled "DYNAMIC UPLINK CONTROL CHANNEL GROUPING," filed Sep. 27, 2022, assigned to the assignee hereof, and expressly incorporated by reference herein.

FIELD OF TECHNOLOGY

The following relates to wireless communications, including dynamic uplink control channel grouping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support dynamic uplink control channel grouping. Generally, the described techniques provide for a user equipment (UE) to select an uplink control channel group for a component carrier (CC) from multiple control channel groups based on a detected trigger at the UE. For example, the UE may receive control signaling indicating the multiple control channel groups for the UE, where each uplink control channel group of the multiple control channel groups is associated with a different set of uplink control channel groups. The UE may select an uplink control channel group for the CC associated with the UE, where the uplink control channel group is selected in accordance with a detected trigger at the UE. In some cases, the detected trigger may be associated with reception of second control signaling indicating the uplink control channel group for the CC or indicating an uplink control channel group configuration from multiple control channel group configurations associated with the multiple uplink control channel groups. In some other cases, the detected trigger may be associated with a timer or counter associated with the multiple uplink control channel groups. In some other case, the detected trigger may be associated with a type of scheduling associated with the CC. Accordingly, the UE may transmit uplink control information (UCI) for the CC in accordance with the selected uplink control channel group.

A method for wireless communications at a UE is described. The method may include receiving control signaling indicating a set of multiple uplink control channel groups for the UE, where each uplink control channel group of the set of multiple uplink control channel groups is associated with a different set of uplink control channel resources, selecting an uplink control channel group for a CC associated with the UE, where the uplink control channel group is selected in accordance with a detected trigger at the UE, and transmitting UCI for the CC in accordance with the selected uplink control channel group.

A UE for wireless communications is described. The UE may include one or more memories storing processor executable code, and one or more processors coupled with the one or more memories. The one or more processors may individually or collectively operable to execute the code to cause the UE to receive control signaling indicating a set of multiple uplink control channel groups for the UE, where each uplink control channel group of the set of multiple uplink control channel groups is associated with a different set of uplink control channel resources, select an uplink control channel group for a CC associated with the UE, where the uplink control channel group is selected in accordance with a detected trigger at the UE, and transmit UCI for the CC in accordance with the selected uplink control channel group.

An apparatus for wireless communications at a UE is described. The apparatus may include a processor, memory coupled with the processor, and instructions stored in the memory. The instructions may be executable by the processor to cause the apparatus to receive control signaling indicating a set of multiple uplink control channel groups for the UE, where each uplink control channel group of the set of multiple uplink control channel groups is associated with a different set of uplink control channel resources, select an uplink control channel group for a CC associated with the UE, where the uplink control channel group is selected in accordance with a detected trigger at the UE, and transmit UCI for the CC in accordance with the selected uplink control channel group.

Another apparatus for wireless communications at a UE is described. The apparatus may include means for receiving control signaling indicating a set of multiple uplink control channel groups for the UE, where each uplink control channel group of the set of multiple uplink control channel groups is associated with a different set of uplink control channel resources, means for selecting an uplink control channel group for a CC associated with the UE, where the uplink control channel group is selected in accordance with a detected trigger at the UE, and means for transmitting UCI for the CC in accordance with the selected uplink control channel group.

A non-transitory computer-readable medium storing code for wireless communications at a UE is described. The code may include instructions executable by a processor to receive control signaling indicating a set of multiple uplink control channel groups for the UE, where each uplink control channel group of the set of multiple uplink control channel groups is associated with a different set of uplink control channel resources, select an uplink control channel group for a CC associated with the UE, where the uplink control channel group is selected in accordance with a detected trigger at the UE, and transmit UCI for the CC in accordance with the selected uplink control channel group.

Some examples of the method, apparatuses, and non-transitory computer-readable medium described herein may further include operations, features, means, or instructions for receiving second control signaling indicating the uplink control channel group for the CC associated with the UE, where the detected trigger may be based on the second control signaling.

In some examples of the method, apparatuses, and non-transitory computer-readable medium described herein, selecting the uplink control channel group for the CC may include operations, features, means, or instructions for selecting the uplink control channel group for the CC based on a time offset where the time offset may be based on transmitting feedback information associated with the second control signaling.

Some examples of the method, apparatuses, and non-transitory computer-readable medium described herein may further include operations, features, means, or instructions for receiving second control signaling indicating a timer or a counter associated with the set of multiple uplink control channel groups, where a first uplink control channel group of the set of multiple uplink control channel groups may be associated with a duration of the timer or a value of the counter being less than or equal to threshold and a second uplink control channel group of the set of multiple uplink control channel groups may be associated with expiration of the timer or the value of the counter being greater than the threshold, and where selecting the uplink control channel group for the CC may be based on the timer or the counter.

In some examples of the method, apparatuses, and non-transitory computer-readable medium described herein, the timer or the counter may be associated with a first quantity of slots for which the UE receives no data transmission on the CC or a second quantity of slots for which the UE receives no third control message scheduling a data transmission on the CC in the first uplink control channel group of the set of multiple uplink control channel groups.

In some examples of the method, apparatuses, and non-transitory computer-readable medium described herein, the set of multiple uplink control channel groups for the UE may be associated with a set of multiple uplink control channel group configurations and the method, apparatuses, and non-transitory computer-readable medium may include further operations, features, means, or instructions for receiving second control signaling indicating a first uplink control channel group configuration of the set of multiple uplink control channel group configurations, where the uplink control channel group for the CC may be based on the first uplink control channel group configuration, and where the detected trigger may be based on the second control signaling.

In some examples of the method, apparatuses, and non-transitory computer-readable medium described herein, receiving the second control signaling may include operations, features, means, or instructions for receiving an indication of an index corresponding to the first uplink control channel group configuration, where the second control signaling includes the indication of the index.

In some examples of the method, apparatuses, and non-transitory computer-readable medium described herein, selecting the uplink control channel group for the CC may include operations, features, means, or instructions for selecting the uplink control channel group for the CC based on a time offset, where the time offset may be based on receiving the second control signaling or transmitting feedback information associated with the second control signaling.

In some examples of the method, apparatuses, and non-transitory computer-readable medium described herein, selecting the uplink control channel group for the CC may include operations, features, means, or instructions for selecting the uplink control channel group for the CC based on a type of scheduling associated with the CC, where the detected trigger may be associated with the type of scheduling.

In some examples of the method, apparatuses, and non-transitory computer-readable medium described herein, a first uplink control channel group of the set of multiple uplink control channel groups may be associated with a first type of scheduling and a second uplink control channel group of the set of multiple uplink control channel groups may be associated with a second type of scheduling.

In some examples of the method, apparatuses, and non-transitory computer-readable medium described herein, the first type of scheduling corresponds to at least one of multi-cell scheduling or cross-carrier scheduling and the second type of scheduling corresponds to single-cell scheduling.

In some examples of the method, apparatuses, and non-transitory computer-readable medium described herein, transmitting the UCI for the CC may include operations, features, means, or instructions for transmitting the UCI for the CC using the set of uplink control channel resources associated with the selected uplink control channel group.

In some examples of the method, apparatuses, and non-transitory computer-readable medium described herein, transmitting the UCI for the CC may include operations, features, means, or instructions for multiplexing the UCI on a set of uplink shared channel resources, where the set of uplink shared channel resources overlap at least partially with the set of uplink control channel resources associated with the selected uplink control channel group.

Some examples of the method, apparatuses, and non-transitory computer-readable medium described herein may further include operations, features, means, or instructions for selecting a second uplink control channel group for a second CC associated with the UE, where the second uplink control channel group may be selected in accordance with the detected trigger at the UE and transmitting second UCI for the second CC.

In some examples of the method, apparatuses, and non-transitory computer-readable medium described herein, the uplink control channel group for the CC may be different than the second uplink control channel group for the second CC.

In some examples of the method, apparatuses, and non-transitory computer-readable medium described herein, the uplink control channel group for the CC may be the same as the second uplink control channel group for the second CC.

A method for wireless communications at a network entity is described. The method may include transmitting first control signaling indicating a set of multiple uplink control channel groups for a UE, where each uplink control channel group of the set of multiple uplink control channel groups is associated with a different set of uplink control channel resources and receiving UCI for a CC in an uplink control channel group of the set of multiple uplink control channel groups.

A network entity for wireless communications is described. The network entity may include one or more memories storing processor executable code, and one or more processors coupled with the one or more memories. The one or more processors may individually or collectively operable to execute the code to cause the network entity to transmit first control signaling indicating a set of multiple uplink control channel groups for a UE, where each uplink control channel group of the set of multiple uplink control channel groups is associated with a different set of uplink control channel resources and receive UCI for a CC in an uplink control channel group of the set of multiple uplink control channel groups.

An apparatus for wireless communications at a network entity is described. The apparatus may include a processor, memory coupled with the processor, and instructions stored in the memory. The instructions may be executable by the processor to cause the apparatus to transmit first control signaling indicating a set of multiple uplink control channel groups for a UE, where each uplink control channel group of the set of multiple uplink control channel groups is associated with a different set of uplink control channel resources and receive UCI for a CC in an uplink control channel group of the set of multiple uplink control channel groups.

Another apparatus for wireless communications at a network entity is described. The apparatus may include means for transmitting first control signaling indicating a set of multiple uplink control channel groups for a UE, where each uplink control channel group of the set of multiple uplink control channel groups is associated with a different set of uplink control channel resources and means for receiving UCI for a CC in an uplink control channel group of the set of multiple uplink control channel groups.

A non-transitory computer-readable medium storing code for wireless communications at a network entity is described. The code may include instructions executable by one or more processors to transmit first control signaling indicating a set of multiple uplink control channel groups for a UE, where each uplink control channel group of the set of multiple uplink control channel groups is associated with a different set of uplink control channel resources and receive UCI for a CC in an uplink control channel group of the set of multiple uplink control channel groups.

Some examples of the method, apparatuses, and non-transitory computer-readable medium described herein may further include operations, features, means, or instructions for transmitting second control signaling indicating the uplink control channel group for the CC.

Some examples of the method, apparatuses, and non-transitory computer-readable medium described herein may further include operations, features, means, or instructions for transmitting second control signaling indicating a timer or a counter associated with the set of multiple uplink control channel groups, where a first uplink control channel group of the set of multiple uplink control channel groups may be associated with a duration of the timer or a value of the counter being less than or equal to threshold and a second uplink control channel group of the set of multiple uplink control channel groups may be associated with expiration of the timer or the value of the counter being greater than the threshold, and where selecting the uplink control channel group for the CC may be based on the timer or the counter.

In some examples of the method, apparatuses, and non-transitory computer-readable medium described herein, the timer or the counter may be associated with a first quantity of slots for which the UE receives no data transmission on the CC or a second quantity of slots for which the UE receives no third control message scheduling a data transmission on the CC in the first uplink control channel group of the set of multiple uplink control channel groups.

In some examples of the method, apparatuses, and non-transitory computer-readable medium described herein, the set of multiple uplink control channel groups for the UE may be associated with a set of multiple uplink control channel group configurations and the method, apparatuses, and non-transitory computer-readable medium may include further operations, features, means, or instructions for transmitting second control signaling indicating a first uplink control channel group configuration of the set of multiple uplink control channel group configurations, where the uplink control channel group for the CC may be based on the first uplink control channel group configuration.

In some examples of the method, apparatuses, and non-transitory computer-readable medium described herein, transmitting the second control signaling may include operations, features, means, or instructions for transmitting an indication of an index corresponding to the first uplink control channel group configuration, where the second control signaling includes the indication of the index.

In some examples of the method, apparatuses, and non-transitory computer-readable medium described herein, receiving the UCI for the CC may include operations, features, means, or instructions for receiving the UCI for the CC using a set of uplink shared channel resources, where the set of uplink shared channel resources overlap at least partially with the set of uplink control channel resources associated with the uplink control channel group.

In some examples of the method, apparatuses, and non-transitory computer-readable medium described herein, receiving the UCI for the CC may include operations, features, means, or instructions for receiving the UCI for the CC using the set of uplink control channel resources associated with the uplink control channel group.

Some examples of the method, apparatuses, and non-transitory computer-readable medium described herein may further include operations, features, means, or instructions for receiving second UCI for a second CC in a second uplink control channel group.

In some examples of the method, apparatuses, and non-transitory computer-readable medium described herein, the uplink control channel group for the CC may be different than the second uplink control channel group for the second CC.

In some examples of the method, apparatuses, and non-transitory computer-readable medium described herein, the uplink control channel group for the CC may be the same as the second uplink control channel group for the second CC.

DETAILED DESCRIPTION

Figure 1:
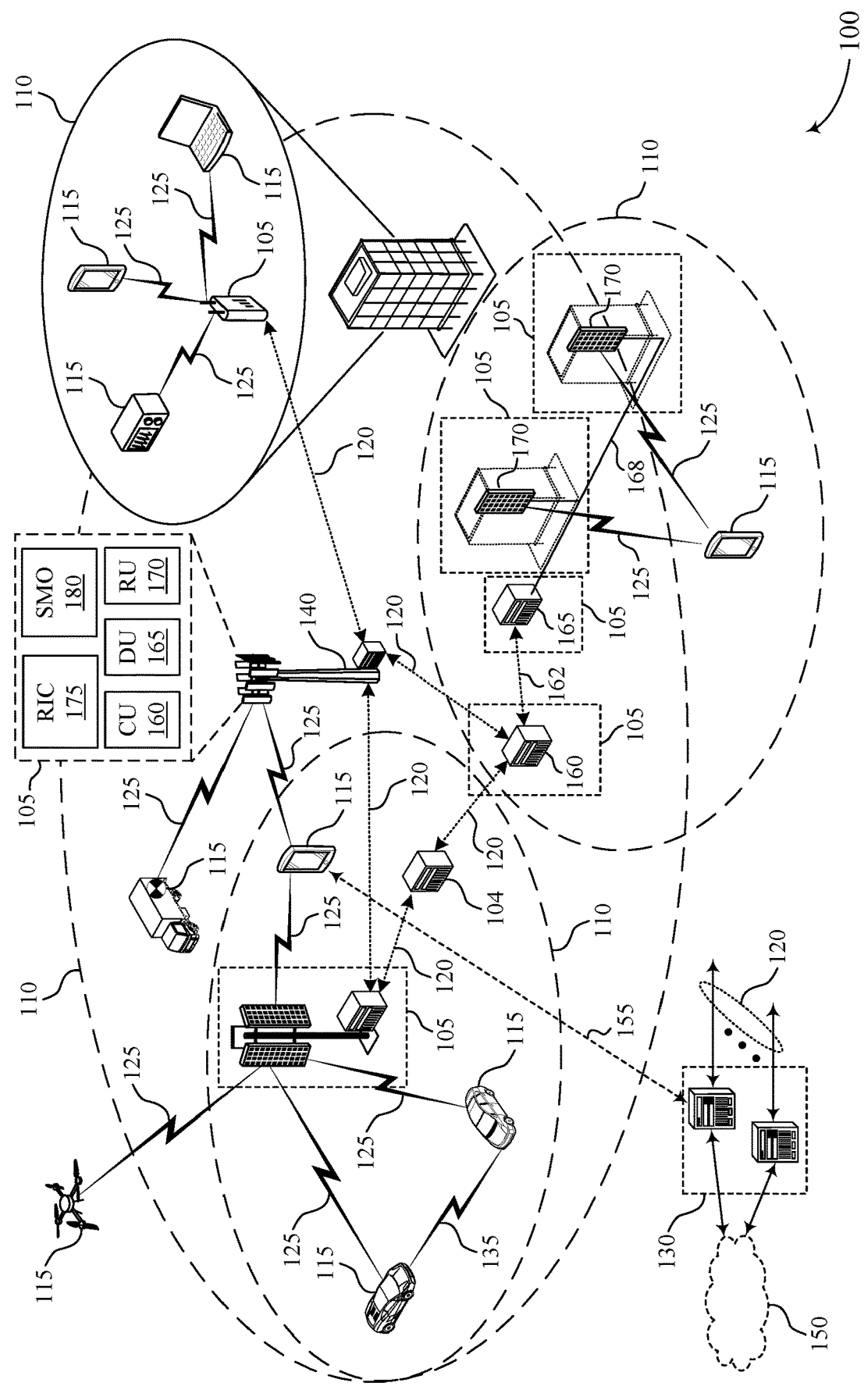
FIG. 1 illustrates an example of a wireless communications system that supports dynamic uplink control channel grouping in accordance with one or more aspects of the present disclosure.

Some wireless communications systems may support carrier aggregation in which a user equipment (UE) may communicate with one or more network entities via multiple component carriers (CC), where each component carrier is associated with a set of frequency resources within a frequency band. In some cases, the UE may receive multiple downlink transmissions on each CC of the multiple CCs and may transmit uplink control information, such as feedback information, for each downlink transmission received via each CC. In some examples, the UE may transmit the uplink control information for one or more CCs according to an uplink control channel group. That is, one or more CCs may belong to an uplink control channel group and the UE may transmit uplink control channel information for one or more downlink transmissions associated with the one or more CCs in a set of resources associated with the uplink control channel group (e.g., in a single transmission). In some examples, the UE may support multiple uplink control channel grouping configurations. For example, a first CC may belong to the first uplink control channel group according to a first uplink control channel group configuration and may belong to a second uplink control channel group according to a second uplink control channel group configuration. In some cases, the first uplink control channel group may be suitable for reporting uplink control information (UCI) (e.g., feedback) of some types of data on the first CC, but not for others. However, existing solutions do not allow for dynamically switching the first CC between uplink control channel groups in response to rapid changes in data type transmitted on the first CC.

Accordingly, techniques described herein may support dynamic uplink control channel grouping for one or more CCs associated with a UE. For example, a network entity may indicate, to a UE, multiple uplink control channel groups for the UE, where each uplink control channel group of the multiple control channel groups may be associated with a different set of uplink control channel resources. Additionally, the UE may select an uplink control channel group for a CC associated with the UE based on a detected trigger. For example, the UE may receive control signaling including an indication of the uplink control channel group for a CC (e.g., an explicit indication, where trigger is based on receiving the control signaling. In another example, the UE may select the uplink control channel group for the CC based on expiration of a timer or a value of a counter exceeding a threshold. In some other examples, each uplink control channel group of the multiple uplink control channel groups may be associated with a respective uplink control channel group configuration, such that the UE may receive control signaling indicating an uplink control channel group configuration associated with the uplink control channel group for the CC, and the trigger may be based on receiving the control signaling. Accordingly, the UE may transit UCI for the CC in accordance with the selected uplink control channel group.

Aspects of the disclosure are initially described in the context of wireless communications systems. Aspects of the disclosure are then described in the context of scheduling configurations and a process flow. Aspects of the disclosure are further illustrated by and described with reference to apparatus diagrams, system diagrams, and flowcharts that relate to dynamic uplink control channel grouping.

FIG. 1 illustrates an example of a wireless communications system 100 that supports dynamic uplink control channel grouping in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support dynamic uplink control channel grouping as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with CCs operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support dynamic uplink control channel grouping. For example, a network entity 105 may transmit, to a UE 115, control signaling indicating multiple uplink control channel groups for the UE 115, and each uplink control channel group may be associated with a different set of uplink control channel resources. For example, the UE 115 may be associated with multiple CCs, including a first CC, and a second CC, and a third CC. As such, the control signaling from the network entity 105 may indicate a first uplink control channel associated with a first set of uplink control channel resources and a second uplink control channel group associated with a second set of uplink control channel resources. In some cases, each CC of the multiple CCs may belong to an uplink control channel group according to an uplink control channel group configuration. For example, a first uplink control channel group configuration may correspond to the first uplink control channel group including the first CC, the second CC, and the third CC, and a second uplink control channel group configuration may correspond to the first uplink control channel group including the first CC and the second CC and the second uplink control channel group including the third CC.

Additionally, the UE 115 may select an uplink control channel group for a CC associated with the UE 115, such as the first CC, in accordance with a detected trigger at the UE 115. For example, the UE 115 may receive second control signaling indicating the uplink control channel group for the first CC or indicating an uplink control channel group configuration including the uplink control channel group for the first CC, and the detected trigger may be associated with receiving the second control signaling. In another example, the UE 115 may initiate a timer or counter based on receiving a downlink transmission on the first CC and may select the uplink control channel group for the first CC based on expiration of the time or a value of the counter exceeding a threshold. In another example, the UE 115 may select the uplink control channel group for the first CC based on a type of scheduling associated with the first CC. That is, the UE 115 may select a first uplink control channel group for the first CC based on the first CC being associated with a first type of scheduling and a second uplink control channel group for the first CC based on the first CC being associated with a second type of scheduling. Accordingly, the UE 115 may transmit uplink control information for the first CC in accordance with the selected uplink control channel group for the first CC.

Figure 2:
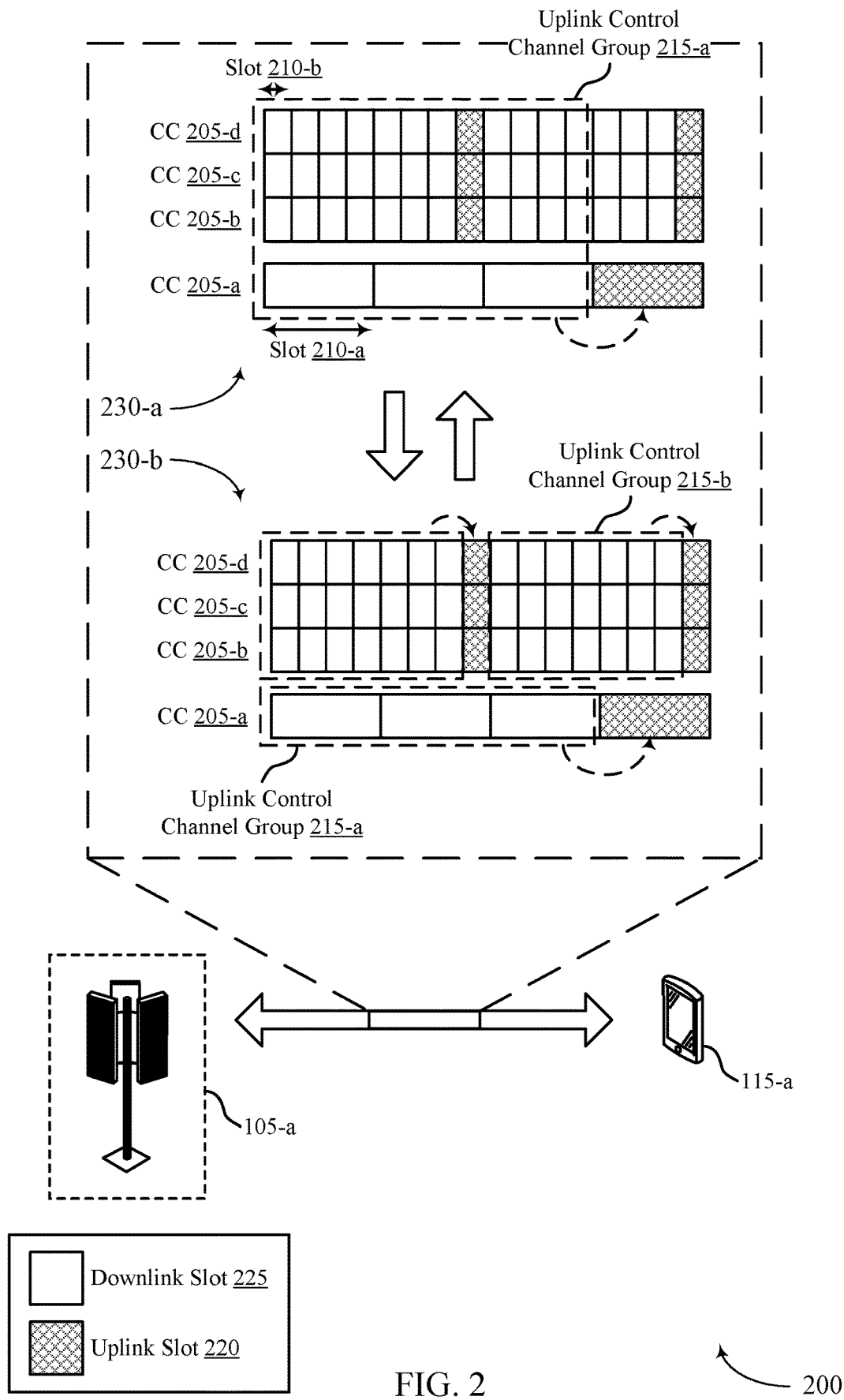
FIG. 2 illustrates an example of a wireless communications system that supports dynamic uplink control channel grouping in accordance with one or more aspects of the present disclosure.

FIG. 2 illustrates an example of a wireless communications system 200 that supports dynamic uplink control channel grouping in accordance with one or more aspects of the present disclosure. In some examples, the wireless communications system 200 may implement aspects of the wireless communications system 100. For example, the wireless communications system 200 may include one or more network entities 105 (e.g., a network entity 105-*a*) and one or more UEs 115 (e.g., a UE 115-*a*), which may be examples of the corresponding devices as described with reference to FIG. 1. In the example of FIG. 2, the network entity 105-*a* may be examples of a CU 160, a DU 165, an RU 170, a base station 140, an IAB node 104, or one or more other network nodes as described with reference to FIG. 1. The wireless communications systems 200 may include features for reduced latency and increased reliability of uplink control information transmissions between the UE 115-*a* and the network entity 105-*a*, among other benefits.

In some examples, the wireless communications system may support carrier aggregation, which may increase (e.g., boost) a peak data rate of a UE 115, such as the UE 115-*a*. That is, the UE 115-*a* may communicate with the network entity 105-*a*, via multiple CCs 205 (e.g., according to a carrier aggregation configuration), including a CC 205-*a*, a CC 205-*b*, a CC 205-*c*, and a CC 205-*d*, where each CC 205 is associated with a set of frequency resources within one or more frequency bands (e.g., FR1, FR2). For example, the CC 205-*a* may be associated with a first frequency band (e.g., FR1) and the CC 205-*b*, the CC 205-*c*, and the CC 205-*d* may be associated with a second frequency band (e.g., FR2). Additionally, the multiple CCs 205 may support multiple numerologies (e.g., different numerologies) associated with respective sub-carrier spacings (SCSs). For example, the CC 205-*a* may support a first SCS (e.g., associated with the first frequency band) resulting in slots 210-*a* (e.g., which may be downlink slots 225 or uplink slots 220) and the CC 205-*b*, the CC 205-*c*, and the CC 205-*d* may support a second SCS (e.g., associated with the second frequency band) resulting in slots 210-*b* (e.g., which may be downlink slots 225 or uplink slots 220).

In some cases, the UE 115-*a* may support a first set of CCs 205 for uplink communications (e.g., UL-CCs 205) and a second set of CCs 205 for downlink communications (e.g., DL-CCs 205), where a first quantity of CCs 205 in the first set of CCs 205 is less than a second quantity of CCs 205 in the second set of CCs 205 (e.g., DL-CCs 205 may be more than UL-CCs in a carrier aggregation configuration). Additionally, or alternatively, the UE 115-*a* may support self-scheduling (e.g., self-carrier scheduling) of the CCs 205 and cross-carrier scheduling of the CCs 205, described with reference to FIG. 3.

In some examples, the UE 115-*a* may transmit uplink control information, such as feedback information (e.g., hybrid automatic repeat request acknowledgment (HARQ-ACK) feedback) for downlink transmissions (e.g., physical downlink control channels (PDSCHs)) received via the multiple CCs 205. Additionally, the UE 115-*a* may transmit the uplink control information (e.g., may perform a HARQ-ACK feedback procedure) for the downlink transmissions according to one or more uplink control channel groupings (e.g., physical uplink control channel (PUCCH) groupings). That is, the UE 115-*a* may receive control signaling (e.g., RRC signaling) indicating (e.g., may be configured with) multiple uplink control channel groups 215 (e.g., up to two PUCCH groups), where each uplink control channel group 215 may be associated with a different set of uplink control channel resources (e.g., PUCCH resources). For example, the UE 115-*a* may be associated (e.g., configured) with an uplink control channel group 215-*a* and an uplink control channel group 215-*b*. Additionally, the uplink control channel group 215-*a* may be associated with a first set of uplink control channel resources in an uplink slot 220 associated with the CC 205-*a* and the uplink control channel group 215-*b* may be associated with a second set of uplink control channel resources in an uplink slot 220 associated with the CC 205-*d*.

Additionally, the UE 115-*a* may support multiple uplink control channel group configurations. That is, a CC 205 may belong to the uplink control channel group 215-*a* according to an uplink control channel group configuration 230-*a* and belong to the uplink control channel group 215-*b* according to an uplink control channel group configuration 230-*b*. For example, the CC 205-*a*, the CC 205-*b*, the CC 205-*c*, and the CC 205-*d* may belong to the uplink control channel group 215-*a* according to the uplink control channel group configuration 230-*a*. Additionally, the CC 205-*a* may belong to the uplink control channel group 215-*a* and the CC 205-*c*, the CC 205-*c*, and the CC 205-*d* may belong to the uplink control channel group 215-*b* according to the uplink control channel group configuration 230-*b*.

In some examples, the UE 115-*a* may operate (e.g., transmit uplink control information) according to the uplink control channel group configuration 230-*a* (e.g., the UE 115-*a* may not support uplink carrier aggregation for downlink carrier aggregation operations). In such cases, transmission of UCI (e.g., PUCCH, UCI) via the CC 205-*a* may be associated with increased reliability as compared to transmission of UCI via the CC 205-*b*, the CC 205-*c*, and the CC 205-*d*. However, an uplink transmission (e.g., UL) on the CC 205-*a* may support multiple (e.g., a lot) of bits associated with UCI (e.g., HARQ-ACK bits) for downlink transmissions (e.g., PDSCHs) on each CC 205 in the uplink control channel group 215-*a* (e.g., as compared to uplink control channel group configuration 230-*b*). Additionally, transmission of UCI (e.g., HARQ-ACK) associated with the CC 205-*b*, the CC 205-*d*, and the CC 205-*c* may be delayed (e.g., as compared to the uplink control channel group configuration 230-*b*). That is, a first duty cycle of the CC 205-*a* may be double (e.g., in length) a second duty cycle of the CC 205-*b*, the CC 205-*c*, and the CC 205-*d*, such that transmission of UCI according to the duty cycle of the CC 205-*b* may result in delays to transmission of UCI associated with the CC 205-*b*, the CC 205-*d*, and the CC 205-*c* (e.g., as compared to transmitting UCI according to the second duty cycle of the CC 205-*b*, the CC 205-*c*, and the CC 205-*d*).

In some other examples, the UE 115-*a* may operate (e.g., transmit uplink control information) according to the uplink control channel group configuration 230-*b* (e.g., the UE 115-*a* may support uplink carrier aggregation for downlink carrier aggregation operations). In such cases, transmission of UCI (e.g., PUCCH, UCI) via the CC 205-*b*, the CC 205-*c*, and the CC 205-*d* may be associated with decreased reliability as compared to transmission of UCI via the CC 205-*a*. However, transmission of UCI transmission of UCI (e.g., HARQ-ACK) associated with the CC 205-*b*, the CC 205-*d*, and the CC 205-*c* (e.g., according to the uplink control channel group configuration 230-*b*) may be associated with lower latency (e.g., as compared to transmission of UCI associated with the CC 205-*b*, the CC 205-*d*, and the CC 205-*c* according to the uplink control channel group configuration 230-*a*). Additionally, transmission of UCI according to the uplink control channel group configuration 230-*b* may support load balancing (e.g., as compared to the uplink control channel group configuration 230-*a*).

As such, each uplink control channel group configuration 230 may be suitable for reporting UCI for some scenarios (e.g., some types of data), but not others (e.g., have different advantages and disadvantages). However, it may be beneficial to dynamically switch between (e.g., select) uplink control channel group configurations (e.g., switch which CCs 205 belong to which uplink control channel group 215) in response to rapid changes in data type transmitted on each CCC 205.

Accordingly, the wireless communications system 200 may support dynamic uplink control channel grouping based on a detected trigger (e.g., condition, indication, or both) at the UE 115-*a*. For example, the network entity 105-*a* may transmit first control signaling (e.g., RRC signaling) to the UE 115-*a* indicating multiple uplink control channel groups 215 (e.g., up to two uplink control channel groups 215), including the uplink control channel group 215-*a* associated with the first set of uplink control resources and uplink control channel group 215-*b* associated with the second set of uplink control resources. Each uplink control channel group 215 may be associated with one or more uplink control channel group configurations 230, such as the uplink control channel group configuration 230-*a* and the uplink control channel group configuration 230-*b*. In some cases, the first control signaling may include an indication of the multiple uplink control channel group configurations 230 (e.g., the network entity 105-*a* may preconfigure the UE 115-*a* with the multiple uplink control channel group configurations 230).

The UE 115-*a* may select an uplink control channel group 215 for a CC 205, such as the CC 205-*b* based on a detected trigger at the UE 115-*a*. For example, the UE 115-*a* may select the uplink control channel group 215-*a* for the CC 205-*b* according to a first detected trigger at the UE 115-*a* and may select the uplink control channel group 215-*b* for the CC 205-*b* according to a second detected trigger at the UE 115-*a*.

In some examples, the UE 115-*a* may receive second control signaling (e.g., MAC-control element (CE) carried by a PDSCH) indicating how each CC 205 is mapped to the uplink control channel groups 215. That is, the detected trigger may be based on the second control signaling (e.g., reception of the second control signaling). For example, the second control signaling may indicate that the CC 205-*a* belongs (e.g., is mapped) to uplink control channel group 215-*a*, the CC 205-*b* belongs to uplink control channel group 215-*b* belongs to the uplink control channel group 215-*b*, the CC 205-*c* belongs to the uplink control channel group 215-*b*, and the CC 205-*d* belongs to the uplink control channel group 215-*b*. In such cases, the UE 115-*a* may apply (e.g., make effective) the indicated uplink control channel grouping (e.g., mapping) according to a time offset (e.g., 3 ms). For example, the time offset may be based on transmitting feedback information associated with the second control signaling. That is, the UE 115-*a* may transmit feedback information for a downlink shared channel (e.g., PDSCH) carrying the second control information (e.g., MAC-CE) and may apply the indicated uplink control channel grouping after a duration (e.g., time duration) associated with the time offset (e.g., the time offset after transmitting the feedback information).

Additionally, or alternatively, the UE 115-*a* may receive second control signaling indicating (e.g., configuring) a timer or a counter, where the detected trigger is based on the time or the counter. That is, the UE 115-*a* may count a quantity of slots (e.g., for an SCS) that the UE 115-*a* receives no data transmission (e.g., PDSCH) on a CC 205, such as the CC 205-*b*, or receives no control signaling (e.g., physical downlink control channel (PDCCH)) scheduling a data transmission (e.g., PDSCH) on the CC 205-*b* in an uplink control channel group 215, such as the uplink control channel group 215-*a*. The UE 115-*a* may determine that the CC 205-*b* belongs to the uplink control channel group 215-*a* based on the quantity of slots being less than or equal to a threshold quantity and that the CC 205-*b* belongs to the uplink control channel group 215-*b* (e.g., a preconfigured uplink control channel group 215) based on the quantity of slots being greater than the threshold quantity.

In some examples, the UE 115-*a* may count the quantity of slots based on the timer. That is, the UE 115-*a* may initiate the timer after receiving a data transmission (e.g., PDSCH) on the CC 205-*b* or receiving control signaling (e.g., PDCCH) scheduling a data transmission (e.g., PDSCH) on the CC 205-*b* in the uplink control channel group 215-*a*. In such cases, the UE 115-*a* may transmit UCI for the CC 205-*b* according to the uplink control channel group 215-*a* while the timer is running (e.g., during a duration of the timer) and may transmit UCI for the CC 205-*b* according to the uplink control channel group 215-*b* after expiration of the timer (e.g., the quantity of slots exceeds a configured value of the timer).

In some other examples, the UE 115-*a* may count the quantity of slots based on the counter. That is, the UE 115-*a* may initiate the counter after receiving a data transmission (e.g., PDSCH) on the CC 205-*b* or receiving control signaling (e.g., PDCCH) scheduling a data transmission (e.g., PDSCH) on the CC 205-*b* in the uplink control channel group 215-*a*. The UE 115-*a* may increment the counter (e.g., by a value of 1) based on each slot that the UE 115-*a* receives no data transmission on the CC 205-*b* or receives no control signaling scheduling a data transmission on the CC 205-*b* in the uplink control channel group 215-*a*. In such cases, the UE 115-*a* may transmit UCI for the CC 205-*b* according to the uplink control channel group 215-*a* based on a value of the counter (e.g., a quantity of slots) being less than or equal to a threshold value (e.g., indicated or configured via the second control signaling) and may transmit UCI for the CC 205-*b* according to the uplink control channel group 215-*b* based on the value of the counter exceeding the threshold value.

Additionally, or alternatively, the UE 115-*a* may receive second control signaling (e.g., downlink control information (DCI)) indicating an uplink control channel group configuration 230 (e.g., from the multiple uplink control channel group configurations 230). That is, the indicated uplink control channel group configuration 230 may indicate how each CC 205 is mapped to the uplink control channel groups 215. For example, the UE 115-*a* may receive the second control signaling indicating the uplink control channel group configuration 230-*a* and may select the uplink control channel group 215-*a* for the CC 205-*a*, the CC 205-*b*, the CC 205-*c*, and the CC 205-*d*.

In some examples, the UE 115-*a* may receive the second control signaling indicating an index corresponding to an uplink control channel group configuration 230. That is, as described previously, the network entity 105-*a* may transmit the first control signaling indicating multiple uplink control channel group configurations 230, and each uplink control channel group configuration 230 may be associated with a respective index. Additionally, the detected trigger may be based on the second control signaling (e.g., reception of the second control signaling). Accordingly, the second control signaling may indicate an index and the UE 115-*a* may select an uplink control channel group 215 for each CC 205 based on an uplink control channel group configuration 230 corresponding to the indicated index. For example, the uplink control channel group configuration 230-*a* may be associated with a first index and the uplink control channel group configuration 230-*b* may be associated with a second index. Additionally, the second control signaling may indicate the second index, such that the UE 115-*a* may select the uplink control channel group 215-*a* for the CC 205-*a* and the uplink control channel group 215-*b* for the CC 205-*b*, the CC 205-*c*, and the CC 205-*d* based on the second index corresponding to the uplink control channel group configuration 230-*b*.

In such cases, the UE 115-*a* may apply (e.g., make effective) the indicated uplink control channel group configuration 230 according to a time offset (e.g., N slots). For example, the time offset may be based on receiving the second control signaling, transmitting feedback information associated with the second control signaling, or both. That is, in some examples, the UE 115-*a* may receive the second control signaling (e.g., DCI) and may apply the indicated uplink control channel group configuration 230 after a duration (e.g., a quantity of slots) associated with the time offset (e.g., the time offset after receiving the second control signaling). Additionally, or alternatively, the UE 115-*a* may transmit feedback information for the second control information (e.g., DCI) and may apply the indicated uplink control channel group configuration 230 after a duration associated with the time offset (e.g., the time offset after transmitting the feedback information).

In some cases, the UE 115-*a* may transmit UCI (e.g., perform a HARQ-ACK feedback procedure) for each CC 205 according to respective uplink control channel groups 215. In some examples, the UE 115-*a* may transmit the UCI (e.g., HARQ-ACK) for each CC 205 (e.g., for PDSCHS associated with each CC 205) in a selected uplink control channel group 215, such as the uplink control channel group 215-*a*, via the first set of resources (e.g., PUCCH) associated with the uplink control channel groups 215-*a*. In such cases, the first set of resources may not overlap a third set of resources associated with an uplink shared channel (e.g., physical uplink shared channel (PUSCH)) further associated with the uplink control channel groups 215-*a*. For example, the UE 115-*a* may select the uplink control channel group 215-*a* for the CC 205-*a*, the CC 205-*b*, the CC 205-*c*, and the CC 205-*d*. Additionally, the third set of resources associated with the uplink shared channel further associated with the uplink control channel group 215-*a* may fall outside of the first set of resources. As such, the UE 115-*a* may transmit UCI (e.g., HARQ-ACK) for the CC 205-*a* (e.g., PDSCH received via the CC 205-*a*), for the CC 205-*b* (e.g., PDSCH received via the CC 205-*b*), for the CC 205-*c* (e.g., PDSCH received via the CC 205-*c*), and for the CC 205-*d* (e.g., PDSCH received via the CC 205-*d*) via the first set of resources.

Additionally, or alternatively, the UE 115-*a* may multiplex UCI (e.g., perform a HARQ-ACK feedback procedure) for each CC 205 (e.g., for PDSCHS associated with each CC 205) in a selected uplink control channel group 215, such as the uplink control channel group 215-*a*, on a fourth set of resources associated with an uplink shared channel (e.g., a fourth set of uplink shared channel resources). In such cases, the first set of resources may overlap, at least partially, with the fourth set of resources. For example, the UE 115-*a* may select the uplink control channel group 215-*a* for the CC 205-*a*, the CC 205-*b*, the CC 205-*c*, and the CC 205-*d*. Additionally, the fourth set of resources associated with the uplink shared channel further associated with the uplink control channel group 215-*a* may overlap with the first set of resources. As such, the UE 115-*a* may multiplex UCI for the CC 205-*a*, for the CC 205-*b*, for the CC 205-*c*, and for the CC 205-*d* on the fourth set of resources. The UE 115-*a* may transmit UCI associated with an uplink control channel group 215 via a set of resources associated with the uplink control channel group 215 or multiplex the UCI associated with an uplink control channel group 215 on a set of uplink shared channel resources associated with the uplink control channel group independently between different uplink control channel groups 215 (e.g., a procedure for HARQ-ACK transmission using a PUCCH or PUSCH is independent between different PUCCH groups).

While much of the present disclosure is described in the context of the uplink control channel group 215-*a* and the uplink control channel group 215-*b*, this is not to be regarded as a limitation of the present disclosure. Indeed, it is contemplated herein that the UE 115 may support two uplink control channel groups 215. In this regard, any quantity of uplink control channel groups 215 may be considered with reference to the techniques described herein. Additionally, or alternatively, any quantity of uplink control channel group configurations 230 and any quantity of CCs 205 may be considered with reference to the techniques described herein.

Figure 3:
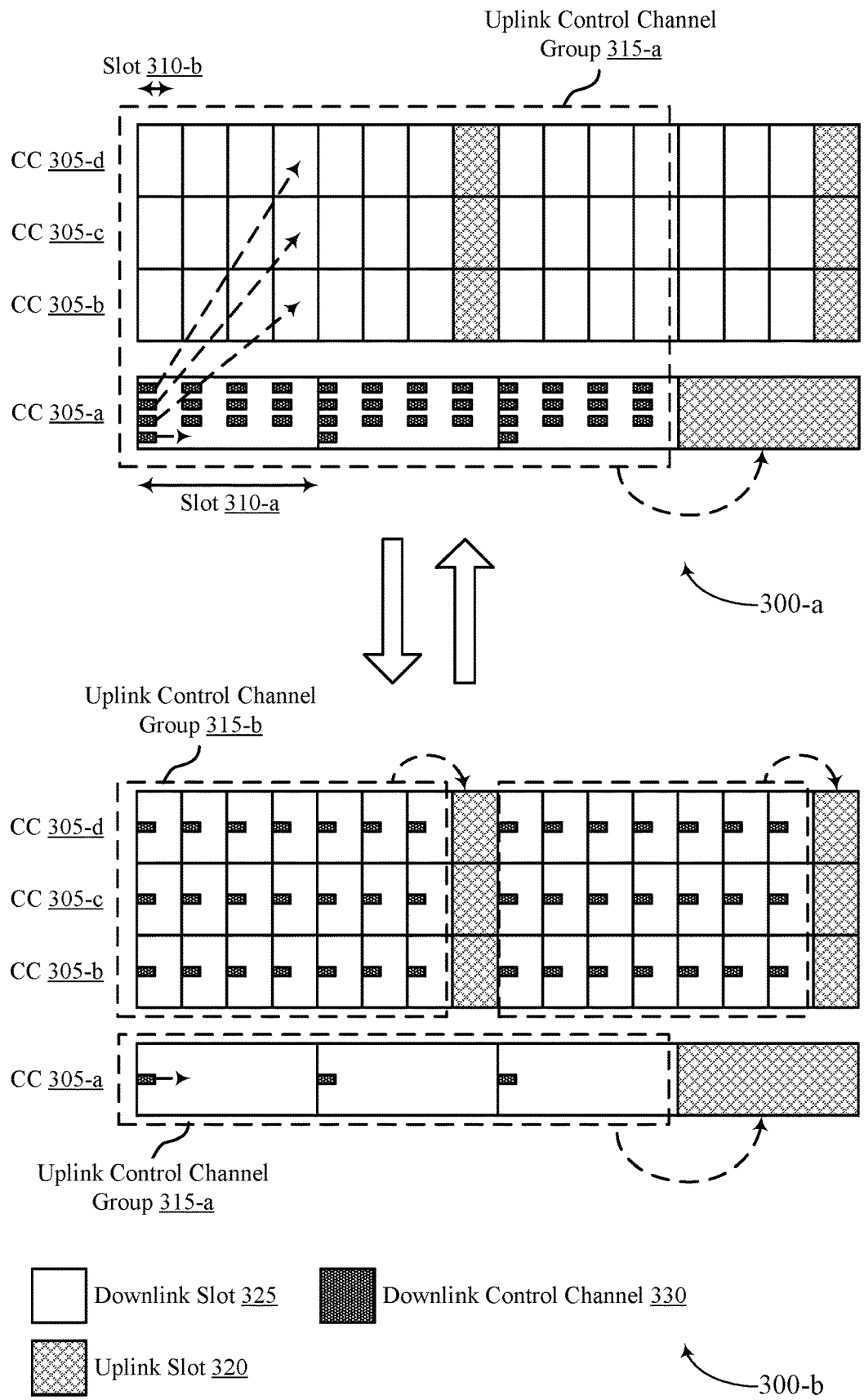
FIG. 3 illustrates examples of scheduling configurations that supports dynamic uplink control channel grouping in accordance with one or more aspects of the present disclosure.

FIG. 3 illustrates an example of scheduling configurations 300 that supports dynamic uplink control channel grouping in accordance with one or more aspects of the present disclosure. In some examples, the scheduling configurations 300 may implement aspects of the wireless communications system 100 and the wireless communications system 200. For example, the scheduling configurations 300 may be implemented by one or more network entities 105 and one or more UEs 115, which may be examples of the corresponding devices as described with reference to FIG. 1. The scheduling configurations 300 may include features for reduced latency and increased reliability of uplink control information transmissions between a UE 115 and a network entity 105, among other benefits.

In some examples, a UE 115 may communicate with a network entity 105 via multiple CCs, including a CC 305-*a*, a CC 305-*b*, a CC 305-*c*, and a CC 305-*d*, where each CC 305 is associated with a set of frequency resources within one or more frequency bands (e.g., FR1, FR2). For example, the CC 305-*a* may be associated with a first frequency band (e.g., FR1) and the CC 305-*b*, the CC 305-*c*, and the CC 305-*d* may be associated with a second frequency band (e.g., FR2). Additionally, the multiple CCs 305 may support multiple numerologies (e.g., different numerologies) associated with respective SCSs. For example, the CC 305-*a* may support a first SCS (e.g., associated with the first frequency band) resulting in slots 310-*a* (e.g., which may be downlink slots 325 or uplink slots 320) and the CC 305-*b*, the CC 305-*c*, and the CC 305-*d* may support a second SCS (e.g., associated with the second frequency band) resulting in slots 310-*b* (e.g., which may be downlink slots 325 or uplink slots 320).

The UE 115 may receive an indication of multiple uplink control channel groups 315, including an uplink control channel group 315-*a* and an uplink control channel group 315-*b*, as described with reference to FIG. 2. Additionally, the UE 115 may select an uplink control channel group 315 for a CC 305 based on a detected trigger at the UE 115-*a*. In some examples, the detected trigger may be based on a type of scheduling associated with the CC 305, which may also be referred to as a scheduling configuration 300.

In some examples, a first CC 305, such as a CC 305-*b*, may be configured with multiple scheduling CCs 305. That is, the UE 115 may monitor a downlink control channel 330 (e.g., PDCCH) for the CC 305-*b* on the multiple scheduling CCs 305 simultaneously or on one CC 305 of the multiple CCs 305 at a time (e.g., not simultaneously). The downlink control channel 330 associated with the CC 305-*b* may schedule one or more downlink data transmissions on the CC 305-*b*.

In some examples, as depicted in scheduling configuration 300-*a*, the UE 115 may monitor the CC 305-*a* for a downlink control channel 330 associated with the CC 305-*a* (e.g., scheduling downlink data transmission on the CC 305-*a*), for a downlink control channel 330 associated with the CC 305-*b*, for a downlink control channel 330 associated with the CC 305-*c*, and for a downlink control channel 330 associated with the CC 305-*b*. That is, the CC 305-*a* may be associated with a first type of scheduling, which may be referred to as single-cell scheduling (e.g., the CC 305-*a* schedules reception of downlink data transmissions on the CC 305-*a*), and the CC 305-*b*, the CC 305-*c*, and the CC 305-*d* may each be associated with a second type of scheduling, which may be referred to as multi-cell scheduling or cross-carrier scheduling (e.g., the CC 305-*a* schedules reception of downlink data transmissions on the CC 305-*b*, the CC 305-*c*, and the CC 305-*d*).

In some examples, as depicted in a scheduling configuration 300-*b*, the UE 115 may monitor the CC 305-*a* for the downlink control channel 330 associated with the CC 305-*a*, may monitor the CC 305-*b* for the downlink control channel 330 associated with the CC 305-*b*, may monitor the CC 305-*c* for the downlink control channel 330 associated with the CC 305-*c*, and may monitor the CC 305-*d* for the downlink control channel 330 associated with the CC 305-*b*. That is, the CC 305-*a*, the CC 305-*b*, the CC 305-*c*, and the CC 305-*d* may each be associated with the first type of scheduling.

Accordingly, the UE 115 may select an uplink control channel group 315 for a CC 305, such as the CC 305-*b*, based on the CC 305-*b* being associated with the first type of scheduling or the second type of scheduling. That is, the UE 115 may select an uplink control channel group 315 for the CC 305-*b* based on which CC 305 the UE 115 monitor or detects the downlink control channel 330 (e.g., PDSCH) scheduling downlink data transmission on the CC 305-*b*.

For example, as depicted in the scheduling configuration 300-*a*, the UE 115 may monitor the CC 305-*a* for the downlink control channel 330 scheduling downlink data transmission on the CC 305-*b*. Thus, the CC 305-*b* may be associated with the second type of scheduling (e.g., multi-cell scheduling). Accordingly, the UE 115 may select the uplink control channel group 315-*a* for the CC 305-*b* based on monitoring the CC 305-*a* for the downlink control channel 330 scheduling data transmission on the CC 305-*b*. In other words, the UE 115 may select the uplink control channel group 315-*a* for the CC 305-*b* based on the CC 305-*b* being associated with the second type of scheduling (e.g., associated with the scheduling configuration 300-*a*). Alternatively, as depicted in the scheduling configuration 300-*b*, the UE 115 may monitor the CC 305-*b* for the downlink control channel 330 scheduling downlink data transmission on the CC 305-*b*. Thus, the CC 305-*b* may be associated with the first type of scheduling (e.g., single-cell scheduling) Accordingly, the UE 115 may select the uplink control channel group 315-*b* for the CC 305-*b* based on monitoring the CC 305-*b* for the downlink control channel 330 scheduling downlink data transmission on the CC 305-*b*. In other words, the UE 115 may select the uplink control channel group 315-*b* for the CC 305-*b* based on the CC 305-*b* being associated with the first type of scheduling (e.g., associated with the scheduling configuration 300-*b*).

In some cases, the UE 115 may select a quantity of uplink control channel groups 315 to use based on the first type of scheduling or the second type of scheduling. That is, the UE 115 may determine to use the uplink control channel group 315-*a* and the uplink control channel group 315-*b* based on monitoring multiple CCs 305 for respective downlink control channels 330 associated with the multiple CCs 305 (e.g., single-cell scheduling), as depicted in the scheduling configuration 300-*b*. Conversely, the UE 115 may determine to use the uplink control channel group 315-*a* based on monitoring a single CC 305, such as the CC 305-*a*, for respective downlink control channels 330 associated with the multiple CCs 305 (multi-cell scheduling), as depicted in the scheduling configuration 300-*b*.

Figure 4:
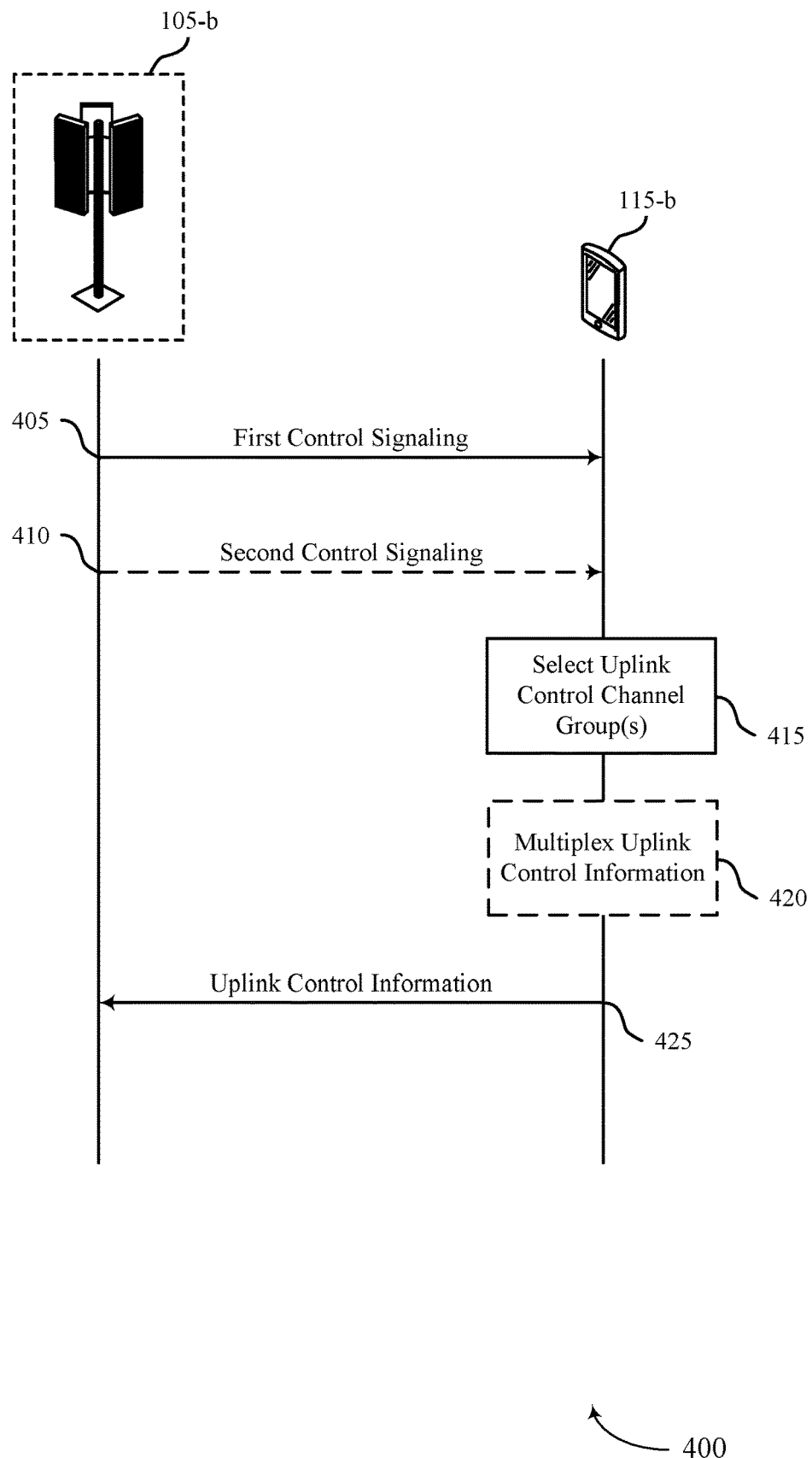
FIG. 4 illustrates an example of a process flow that supports dynamic uplink control channel grouping in accordance with one or more aspects of the present disclosure.

FIG. 4 illustrates an example of a process flow 400 that supports dynamic uplink control channel grouping in accordance with one or more aspects of the present disclosure. In some examples, the process flow 400 may implement aspects of the wireless communications system 100, the wireless communications system 200, and the scheduling configurations 300. For example, the process flow 400 may include one or more network entities 105 (e.g., a network entity 105-*b*) and one or more UEs 115 (e.g., a UE 115-*b*), which may be examples of the corresponding devices as described with reference to FIG. 1. In the example of FIG. 4, the network entity 105-*b* may be examples of a CU 160, a DU 165, an RU 170, a base station 140, an IAB node 104, or one or more other network nodes as described with reference to FIG. 1. The process flow 400 may include features for reduced latency and increased reliability of uplink control information transmissions between the UE 115-*b* and the network entity 105-*b*, among other benefits.

At 405, the network entity 105-*b* may transmit, to the UE 115-*b*, first control signaling indicating multiple uplink control channel groups for the UE 115-*b*, where each uplink control channel group of the multiple uplink control channel groups is associated with a different set of uplink control channel resources. In some cases, the multiple uplink control channel groups may be associated with multiple uplink control channel group configurations. For example, a CC may belong to a first uplink control channel group according to a first uplink control channel group configuration and may belong to a second uplink control channel group according to a second uplink control channel group configuration.

In some cases, at 410, the network entity 105-*b* may transmit, to the UE 115-*b*, second control signaling. In some examples, the second control signaling (e.g., MAC-CE) may indicate an uplink control channel group for a CC associated with the UE. Additionally, or alternatively, the second control signaling (e.g., DCI) may indicate an uplink control channel group configuration from the multiple uplink control channel group configurations (e.g., signaled via the first control signaling). In some examples, the second control signaling may include an index corresponding to the uplink control channel group configuration from the multiple uplink control channel group configurations.

Additionally, or alternatively, the second control signaling may indicate a timer or counter associated with the multiple uplink control channel groups. In some cases, a first uplink control channel group may be associated with a duration of the timer or a value of the counter being less than or equal to threshold and a second uplink control channel group of the multiple uplink control channel groups may be associated with expiration of the timer or the value of the counter being greater than the threshold. Additionally, the time or the counter may be associated with a first quantity of slots for which the UE 115-*b* receives no data transmission on the CC or a second quantity of slots for which the UE 115-*b* receives no third control message scheduling a data transmission on the CC in the first uplink control channel group of the multiple uplink control channel groups.

At 415, the UE 115-*b* may select an uplink control channel group for the CC associated with the UE 115-*b*, and the uplink control channel group may be selected in accordance with a detected trigger at the UE 115-*b*. In some cases, the detected trigger may be associated with (e.g., based on) the second control signaling. That is, the UE 115-*b* may select the uplink control channel group for the CC based on the uplink control channel group or the uplink control channel group configuration indicated in the second control signaling.

Additionally, or alternatively, the detected trigger may be associated with expiration of the timer or a value of the counter. That is, as described previously, the UE 115-*b* may select the first uplink control channel group for the CC prior to expiration of the timer (e.g., during the duration of the timer) or prior to the value of the counter exceeding a threshold (e.g., being less than the threshold) and may select the second uplink control channel group for the CC after expiration of the timer or after the value of the counter exceeds the threshold.

Additionally, or alternatively, the detected trigger may be associated with a type of scheduling associated with the CC, such that the UE 115-*b* may select the uplink control channel group for the CC based on the type of scheduling associated with the CC. For example, a first uplink control channel group of the multiple uplink control channel groups may be associated with a first type of scheduling and a second uplink control channel group of the multiple uplink control channel groups may be associated with a second type of scheduling. In some cases, the first type of scheduling may correspond to at least one of multi-cell scheduling or cross-carrier scheduling and the second type of scheduling may correspond to single-cell scheduling.

In some cases, the UE 115-*b* may apply (e.g., select and apply) the uplink control channel group for the CC based on a time offset (e.g., time delay), and the time offset may be based on transmitting feedback associated with the second control signaling or based on receiving the second control signaling. For example, the UE 115-*b* may receive the second control signaling (e.g., indicating an uplink control channel group configuration) and may apply (e.g., activate, make effective) the uplink control channel group for the CC the time offset (e.g., N slots) after receiving the second control signaling. In another example, the UE 115-*b* may transmit feedback information (e.g., ACK) for the second control signaling (e.g., DCI) may apply the uplink control channel group for the CC the time offset (e.g., N slots) after transmitting the feedback information for the second control signaling. In another example, the UE 115-*b* may transmit feedback information for a downlink shared channel (e.g., PDSCH) associated with the second control signaling (e.g., MAC-CE) and may apply the uplink control channel group for the CC the time offset (e.g., 3 ms) after transmitting the feedback information for the downlink shared channel (e.g., from timing that the UE 115-*b* transmits the ACK).

In some examples, the UE 115-*b* may select a second uplink control channel group for a second CC associated with the UE 115-*b*, and the second uplink control channel group may be selected in accordance with the detected trigger at the UE 115-*b*. In some cases, the uplink control channel group for the CC may be the same as the second uplink control channel group for the second CC. Alternatively, the uplink control channel group for the CC may be the different than the second uplink control channel group for the second CC.

In some cases, at 420, the UE may multiplex uplink control information for the CC on a set of uplink shared channel resources, and the set of uplink shared channel resources may overlap at least partially with the set of uplink control channel resources associated with the selected uplink control channel group.

At 425, the UE 115-*b* may transmit the uplink control information for the CC in accordance with the selected uplink control channel group. In some examples, the UE 115-*b* may transmit the uplink control information for the CC using the set of uplink control channel resources associated with the selected uplink control channel group. In some other examples, the UE 115-*b* may transmit the multiplexed uplink control information for the CC on the set of uplink shared channel resources.

In some examples, the UE 115-*b* may transmit second uplink control information for the second component carrier in accordance with the selected second uplink control channel group.

Figure 5:
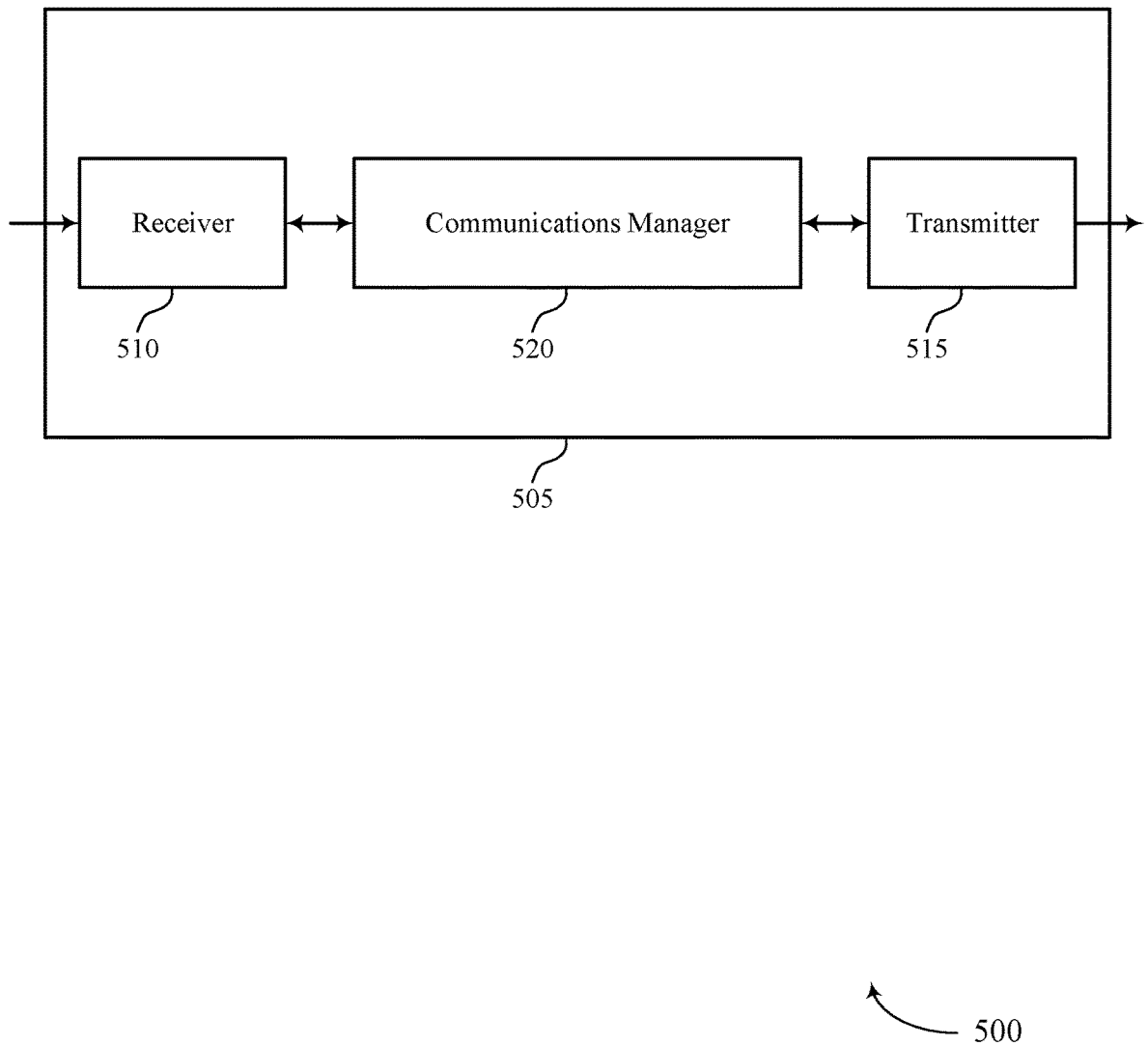
FIGS. 5 and 6 show block diagrams of devices that support dynamic uplink control channel grouping in accordance with one or more aspects of the present disclosure.

FIG. 5 shows a block diagram 500 of a device 505 that supports dynamic uplink control channel grouping in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may also include one or more processors, memory coupled with the one or more processors, and instructions stored in the memory that are executable by the one or more processors to enable the one or more processors to perform features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to dynamic uplink control channel grouping). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to dynamic uplink control channel grouping). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of dynamic uplink control channel grouping as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, in some examples, the communications manager 520, the receiver 510, the transmitter 515, or various combinations or components thereof may be implemented in code (e.g., as communications management software or firmware) executed by at least one processor. If implemented in code executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving control signaling indicating a set of multiple uplink control channel groups for the UE, where each uplink control channel group of the set of multiple uplink control channel groups is associated with a different set of uplink control channel resources. The communications manager 520 may be configured as or otherwise support a means for selecting an uplink control channel group for a CC associated with the UE, where the uplink control channel group is selected in accordance with a detected trigger at the UE. The communications manager 520 may be configured as or otherwise support a means for transmitting uplink control information for the CC in accordance with the selected uplink control channel group.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for dynamic uplink control channel grouping which may result in reduced processing, reduced power consumption, and more efficient utilization of communication resources, among other advantages.

Figure 6:
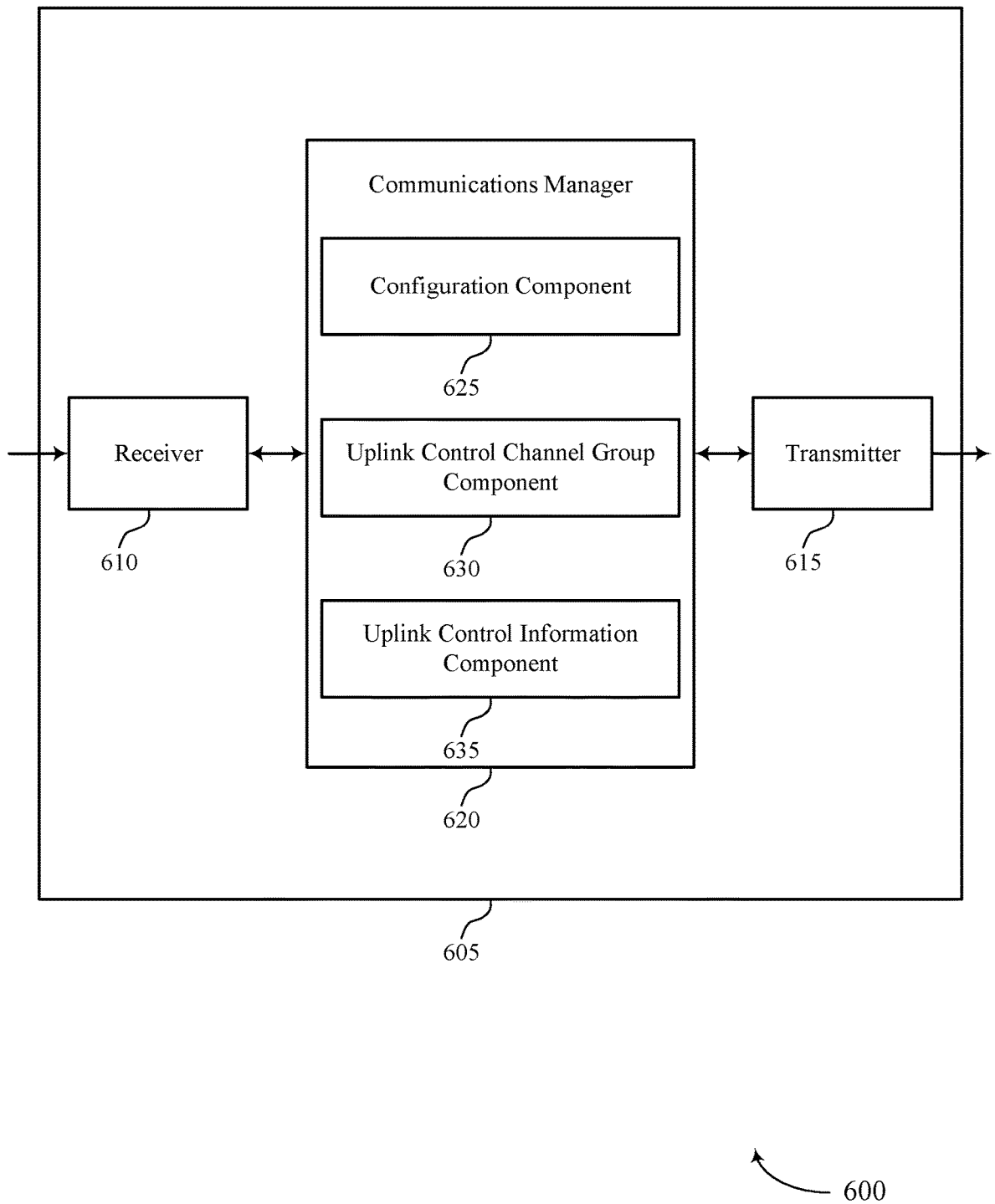

FIG. 6 shows a block diagram 600 of a device 605 that supports dynamic uplink control channel grouping in accordance with one or more aspects of the present disclosure. The device 605 may be an example of aspects of a device 505 or a UE 115 as described herein. The device 605 may include a receiver 610, a transmitter 615, and a communications manager 620. The device 605 may also include one or more processors. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic uplink control channel grouping). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to dynamic uplink control channel grouping). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of dynamic uplink control channel grouping as described herein. For example, the communications manager 620 may include a configuration component 625, an uplink control channel group component 630, an uplink control information component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The configuration component 625 may be configured as or otherwise support a means for receiving control signaling indicating a set of multiple uplink control channel groups for the UE, where each uplink control channel group of the set of multiple uplink control channel groups is associated with a different set of uplink control channel resources. The uplink control channel group component 630 may be configured as or otherwise support a means for selecting an uplink control channel group for a CC associated with the UE, where the uplink control channel group is selected in accordance with a detected trigger at the UE. The uplink control information component 635 may be configured as or otherwise support a means for transmitting uplink control information for the CC in accordance with the selected uplink control channel group.

Figure 7:
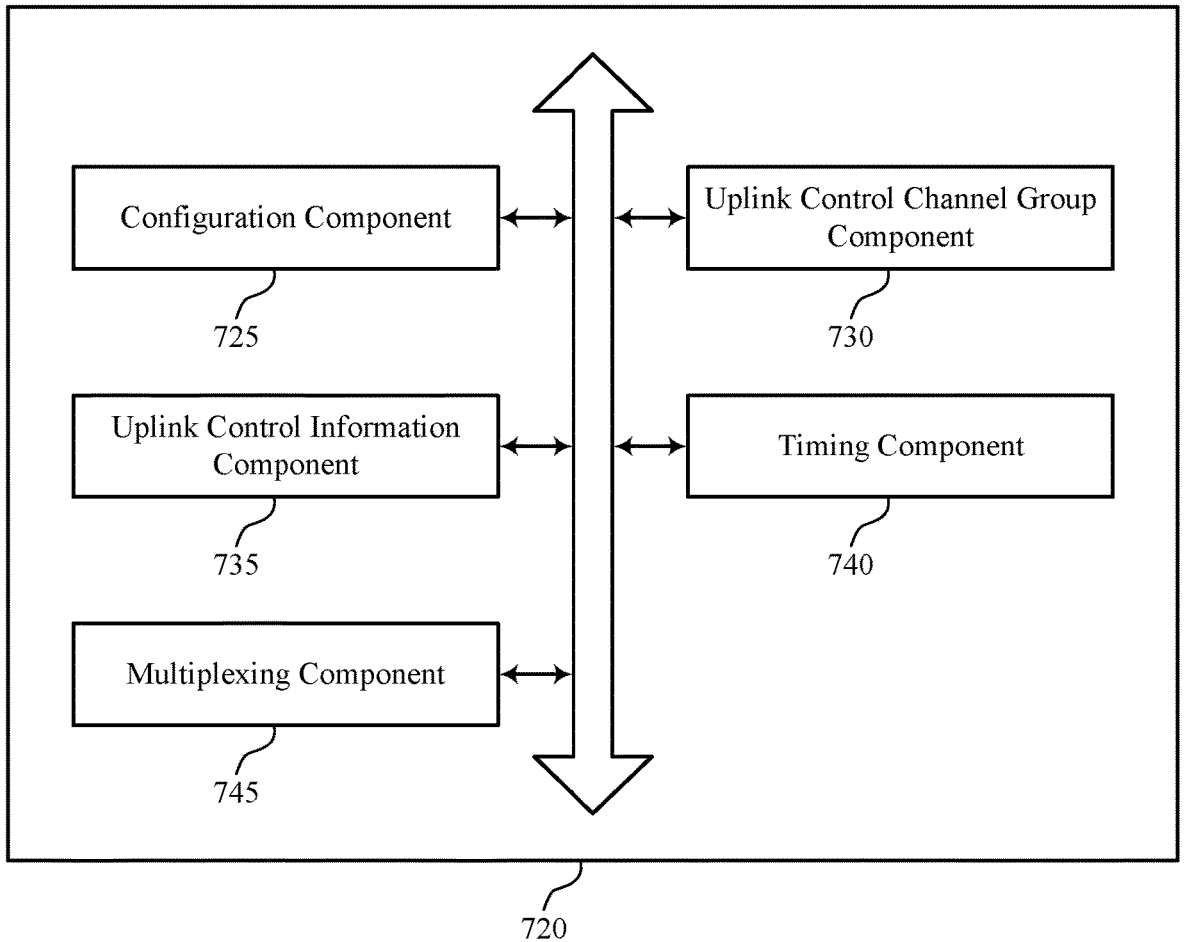
FIG. 7 shows a block diagram of a communications manager that supports dynamic uplink control channel grouping in accordance with one or more aspects of the present disclosure.

FIG. 7 shows a block diagram 700 of a communications manager 720 that supports dynamic uplink control channel grouping in accordance with one or more aspects of the present disclosure. The communications manager 720 may be an example of aspects of a communications manager 520, a communications manager 620, or both, as described herein. The communications manager 720, or various components thereof, may be an example of means for performing various aspects of dynamic uplink control channel grouping as described herein. For example, the communications manager 720 may include a configuration component 725, an uplink control channel group component 730, an uplink control information component 735, a timing component 740, a multiplexing component 745, or any combination thereof. Each of these components may communicate, directly or indirectly, with one another (e.g., via one or more buses).

The communications manager 720 may support wireless communications at a UE in accordance with examples as disclosed herein. The configuration component 725 may be configured as or otherwise support a means for receiving control signaling indicating a set of multiple uplink control channel groups for the UE, where each uplink control channel group of the set of multiple uplink control channel groups is associated with a different set of uplink control channel resources. The uplink control channel group component 730 may be configured as or otherwise support a means for selecting an uplink control channel group for a CC associated with the UE, where the uplink control channel group is selected in accordance with a detected trigger at the UE. The uplink control information component 735 may be configured as or otherwise support a means for transmitting uplink control information for the CC in accordance with the selected uplink control channel group.

In some examples, the uplink control channel group component 730 may be configured as or otherwise support a means for receiving second control signaling indicating the uplink control channel group for the CC associated with the UE, where the detected trigger is based on the second control signaling.

In some examples, to support selecting the uplink control channel group for the CC, the timing component 740 may be configured as or otherwise support a means for selecting the uplink control channel group for the CC based on a time offset where the time offset is based on transmitting feedback information associated with the second control signaling.

In some examples, the timing component 740 may be configured as or otherwise support a means for receiving second control signaling indicating a timer or a counter associated with the set of multiple uplink control channel groups, where a first uplink control channel group of the set of multiple uplink control channel groups is associated with a duration of the timer or a value of the counter being less than or equal to threshold and a second uplink control channel group of the set of multiple uplink control channel groups is associated with expiration of the timer or the value of the counter being greater than the threshold, and where selecting the uplink control channel group for the CC is based on the timer or the counter.

In some examples, the timer or the counter is associated with a first quantity of slots for which the UE receives no data transmission on the CC or a second quantity of slots for which the UE receives no third control message scheduling a data transmission on the CC in the first uplink control channel group of the set of multiple uplink control channel groups.

In some examples, the set of multiple uplink control channel groups for the UE is associated with a set of multiple uplink control channel group configurations, and the uplink control channel group component 730 may be configured as or otherwise support a means for receiving second control signaling indicating a first uplink control channel group configuration of the set of multiple uplink control channel group configurations, where the uplink control channel group for the CC is based on the first uplink control channel group configuration, and where the detected trigger is based on the second control signaling.

In some examples, to support receiving the second control signaling, the uplink control channel group component 730 may be configured as or otherwise support a means for receiving an indication of an index corresponding to the first uplink control channel group configuration, where the second control signaling includes the indication of the index.

In some examples, to support selecting the uplink control channel group for the CC, the timing component 740 may be configured as or otherwise support a means for selecting the uplink control channel group for the CC based on a time offset, where the time offset is based on receiving the second control signaling or transmitting feedback information associated with the second control signaling.

In some examples, to support selecting the uplink control channel group for the CC, the uplink control information component 735 may be configured as or otherwise support a means for selecting the uplink control channel group for the CC based on a type of scheduling associated with the CC, where the detected trigger is associated with the type of scheduling.

In some examples, a first uplink control channel group of the set of multiple uplink control channel groups is associated with a first type of scheduling and a second uplink control channel group of the set of multiple uplink control channel groups is associated with a second type of scheduling.

In some examples, the first type of scheduling corresponds to at least one of multi-cell scheduling or cross-carrier scheduling and the second type of scheduling corresponds to single-cell scheduling.

In some examples, to support transmitting the uplink control information for the CC, the uplink control information component 735 may be configured as or otherwise support a means for transmitting the uplink control information for the CC using the set of uplink control channel resources associated with the selected uplink control channel group.

In some examples, to support transmitting the uplink control information for the CC, the multiplexing component 745 may be configured as or otherwise support a means for multiplexing the uplink control information on a set of uplink shared channel resources, where the set of uplink shared channel resources overlap at least partially with the set of uplink control channel resources associated with the selected uplink control channel group.

In some examples, the uplink control channel group component 730 may be configured as or otherwise support a means for selecting a second uplink control channel group for a second CC associated with the UE, where the second uplink control channel group is selected in accordance with the detected trigger at the UE. In some examples, the uplink control information component 735 may be configured as or otherwise support a means for transmitting second uplink control information for the second CC.

In some examples, the uplink control channel group for the CC is different than the second uplink control channel group for the second CC.

In some examples, the uplink control channel group for the CC is the same as the second uplink control channel group for the second CC.

Figure 8:
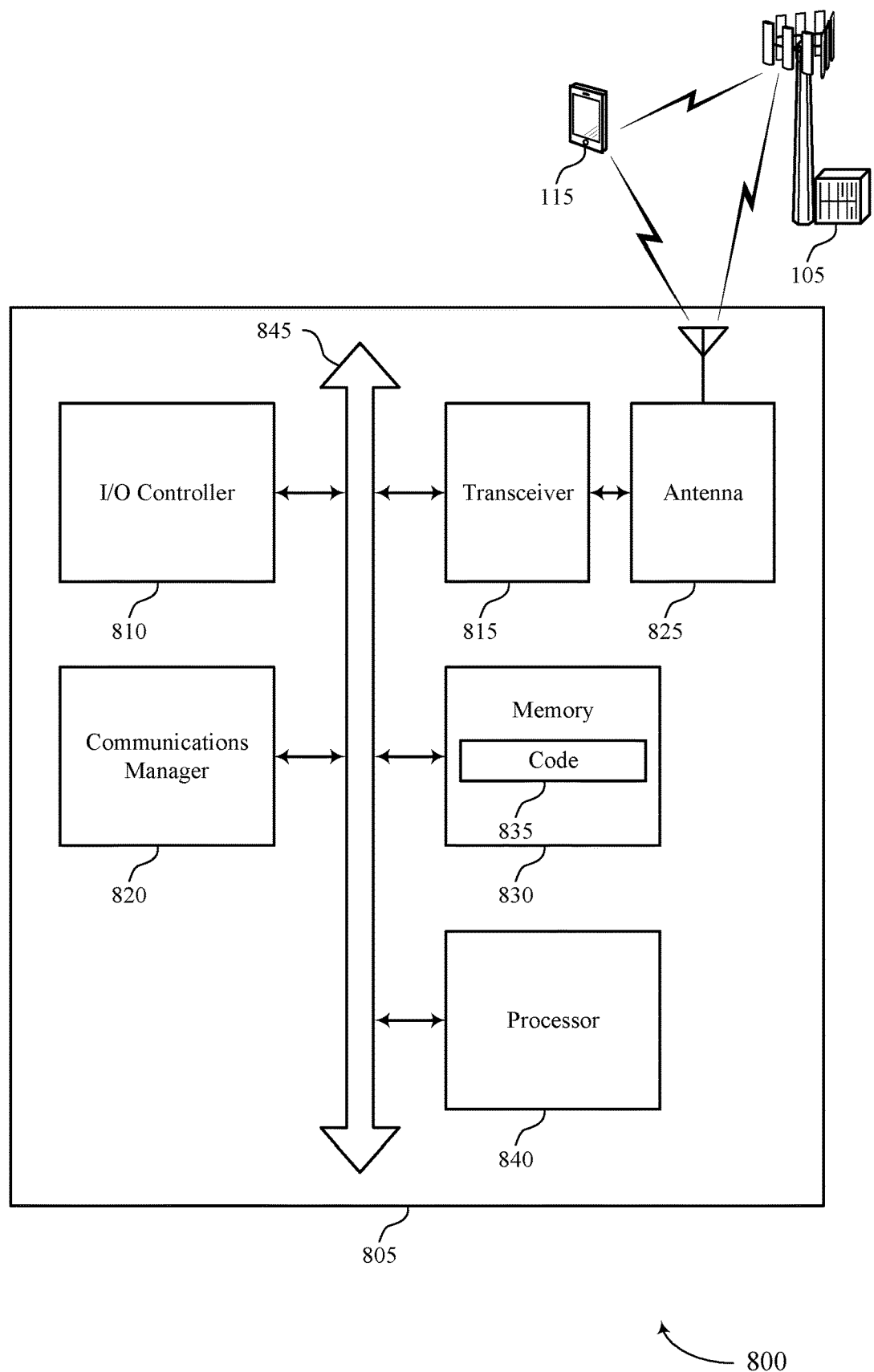
FIG. 8 shows a diagram of a system including a device that supports dynamic uplink control channel grouping in accordance with one or more aspects of the present disclosure.

FIG. 8 shows a diagram of a system 800 including a device 805 that supports dynamic uplink control channel grouping in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting two stage WUSs for a low power radio). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communications at a UE in accordance with examples as disclosed herein. For example, the communications manager 820 may be configured as or otherwise support a means for receiving control signaling indicating a set of multiple uplink control channel groups for the UE, where each uplink control channel group of the set of multiple uplink control channel groups is associated with a different set of uplink control channel resources. The communications manager 820 may be configured as or otherwise support a means for selecting an uplink control channel group for a CC associated with the UE, where the uplink control channel group is selected in accordance with a detected trigger at the UE. The communications manager 820 may be configured as or otherwise support a means for transmitting uplink control information for the CC in accordance with the selected uplink control channel group.

By including or configuring the communications manager 820 in accordance with examples as described herein, the device 805 may support techniques for dynamic uplink control channel grouping which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of two stage WUSs for a low power radio as described herein, or the at least one processor 840 and the at least one memory 830 may be otherwise configured to, individually or collectively, perform or support such operations.

Figure 9:
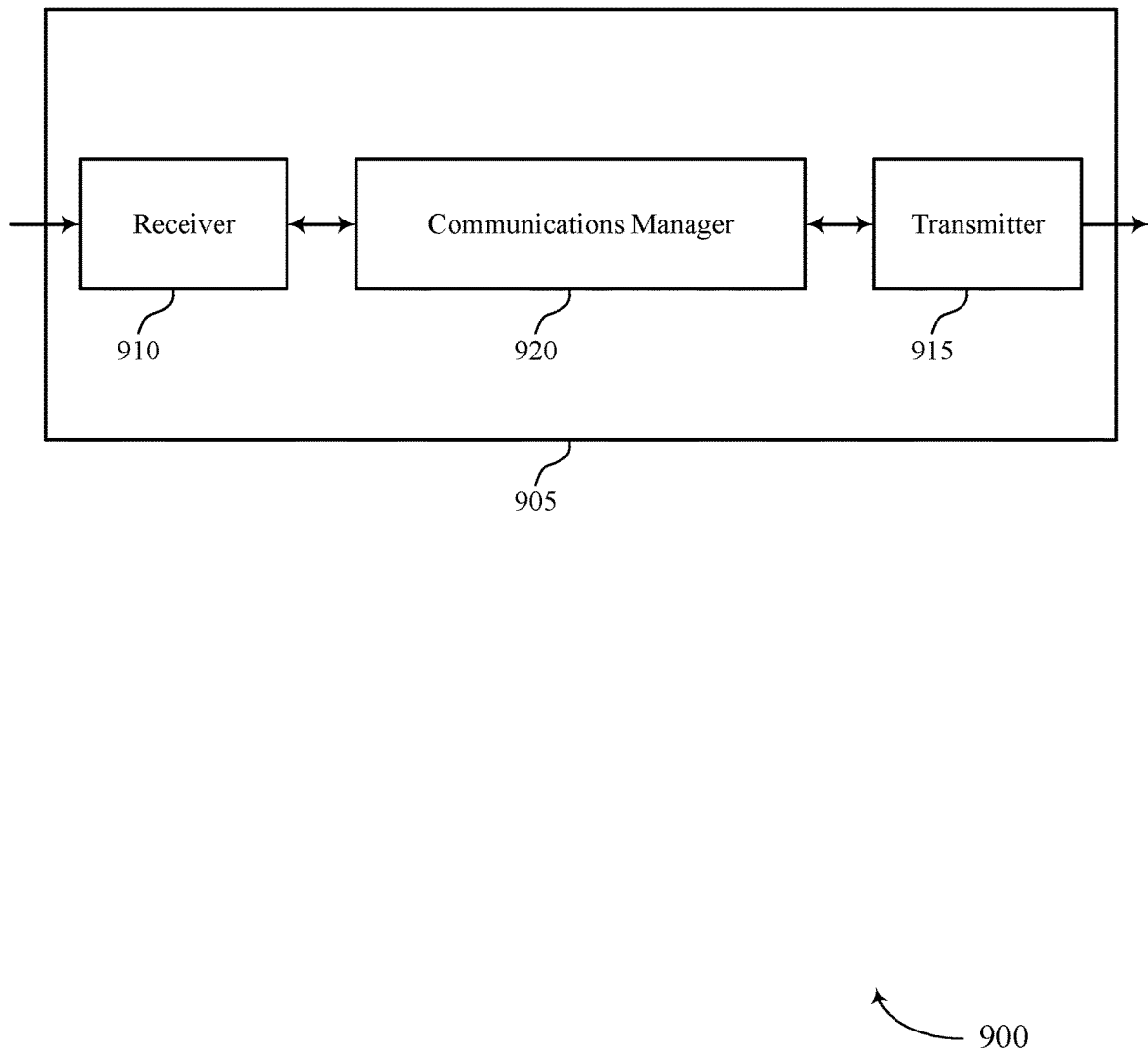
FIGS. 9 and 10 show block diagrams of devices that support dynamic uplink control channel grouping in accordance with one or more aspects of the present disclosure.

FIG. 9 shows a block diagram 900 of a device 905 that supports dynamic uplink control channel grouping in accordance with one or more aspects of the present disclosure. The device 905 may be an example of aspects of a network entity 105 as described herein. The device 905 may include a receiver 910, a transmitter 915, and a communications manager 920. The device 905 may also include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of dynamic uplink control channel grouping as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for transmitting first control signaling indicating a set of multiple uplink control channel groups for a UE, where each uplink control channel group of the set of multiple uplink control channel groups is associated with a different set of uplink control channel resources. The communications manager 920 may be configured as or otherwise support a means for receiving uplink control information for a CC in an uplink control channel group of the set of multiple uplink control channel groups.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for dynamic uplink control channel grouping which may result in reduced processing, reduced power consumption, and more efficient utilization of communication resources, among other advantages.

Figure 10:
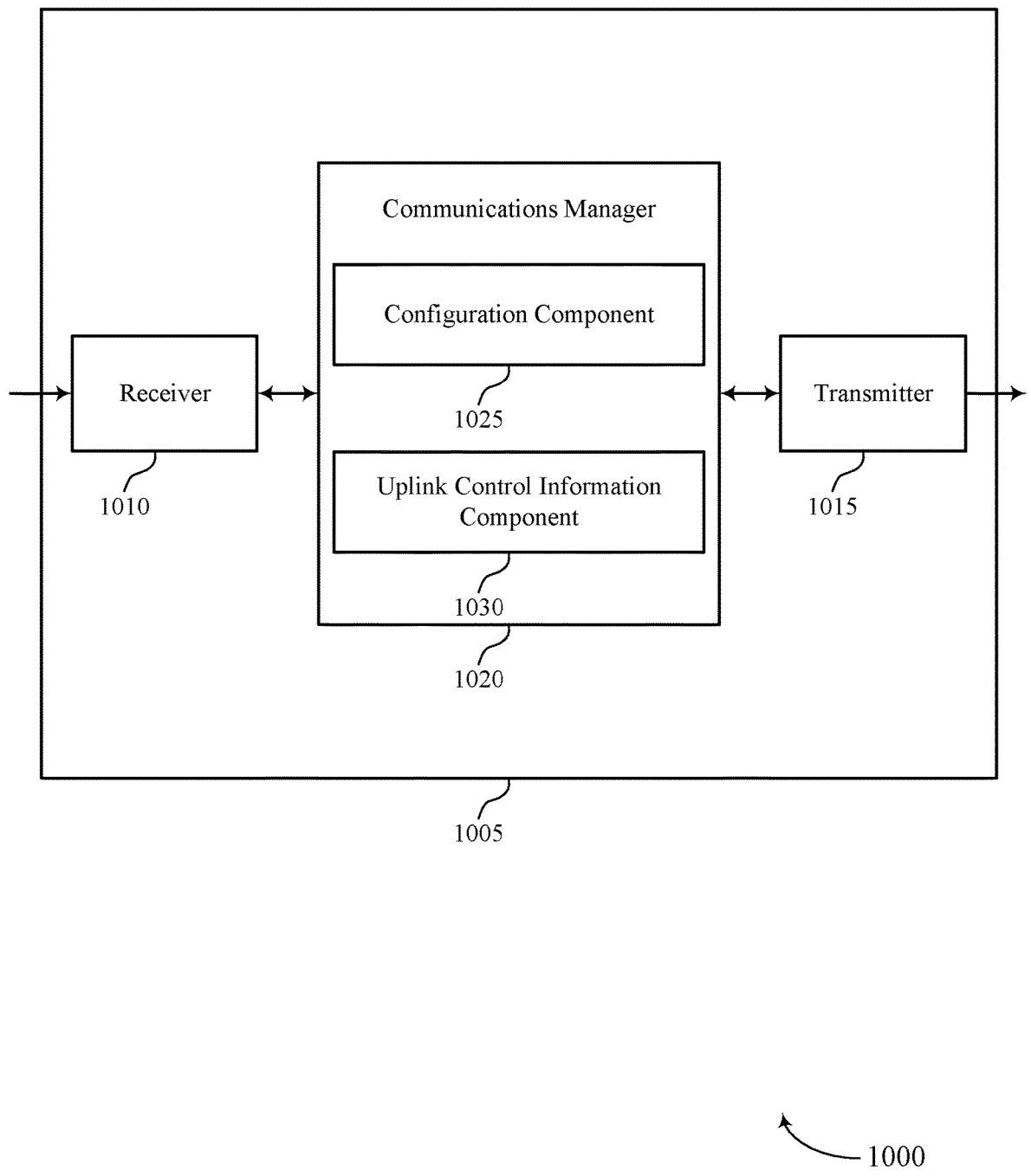

FIG. 10 shows a block diagram 1000 of a device 1005 that supports dynamic uplink control channel grouping in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include one or more processors. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of dynamic uplink control channel grouping as described herein. For example, the communications manager 1020 may include a configuration component 1025 an uplink control information component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The configuration component 1025 may be configured as or otherwise support a means for transmitting first control signaling indicating a set of multiple uplink control channel groups for a UE, where each uplink control channel group of the set of multiple uplink control channel groups is associated with a different set of uplink control channel resources. The uplink control information component 1030 may be configured as or otherwise support a means for receiving uplink control information for a CC in an uplink control channel group of the set of multiple uplink control channel groups.

Figure 11:
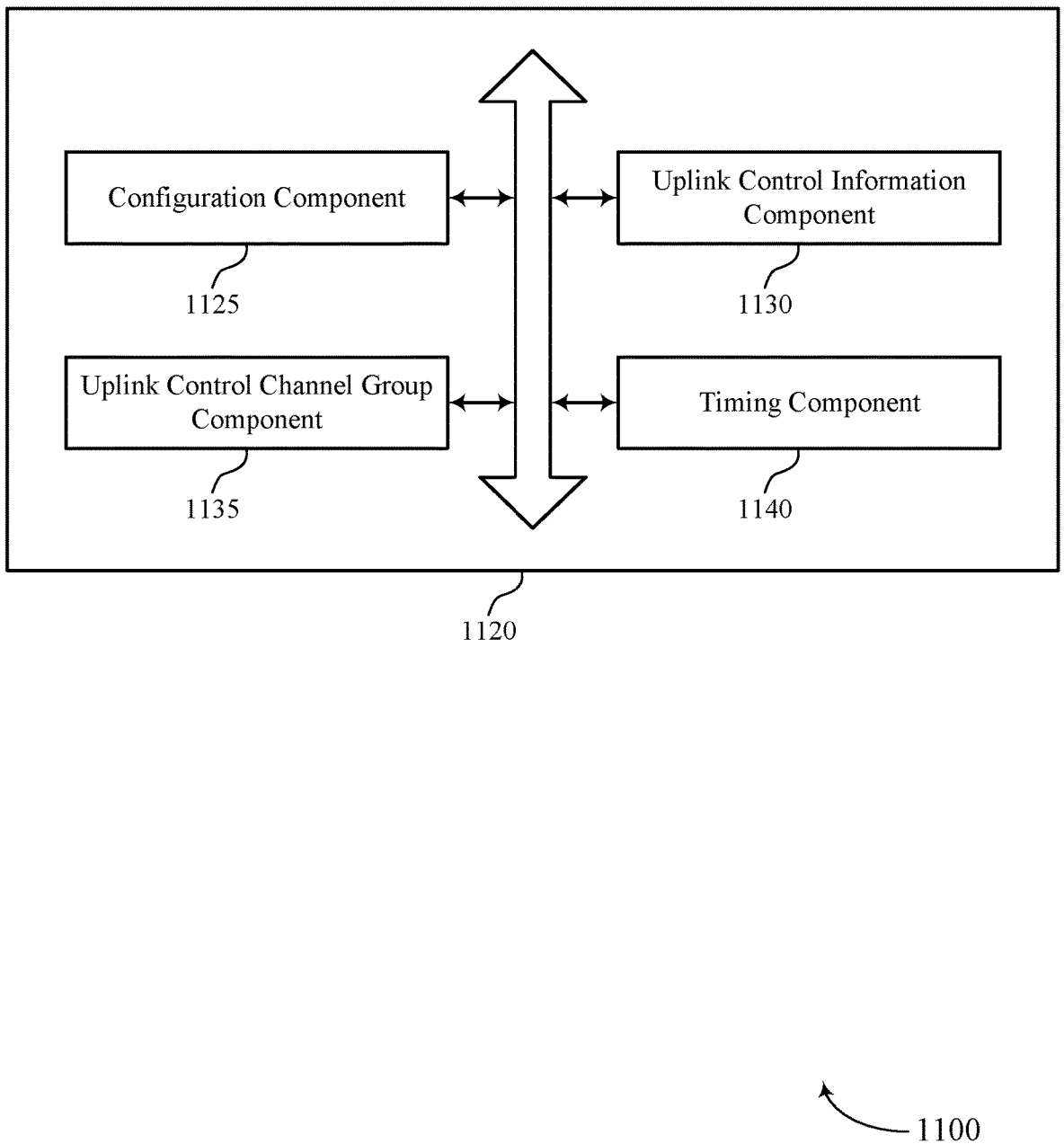
FIG. 11 shows a block diagram of a communications manager that supports dynamic uplink control channel grouping in accordance with one or more aspects of the present disclosure.

FIG. 11 shows a block diagram 1100 of a communications manager 1120 that supports dynamic uplink control channel grouping in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of dynamic uplink control channel grouping as described herein. For example, the communications manager 1120 may include a configuration component 1125, an uplink control information component 1130, an uplink control channel group component 1135, a timing component 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The configuration component 1125 may be configured as or otherwise support a means for transmitting first control signaling indicating a set of multiple uplink control channel groups for a UE, where each uplink control channel group of the set of multiple uplink control channel groups is associated with a different set of uplink control channel resources. The uplink control information component 1130 may be configured as or otherwise support a means for receiving uplink control information for a CC in an uplink control channel group of the set of multiple uplink control channel groups.

In some examples, the uplink control channel group component 1135 may be configured as or otherwise support a means for transmitting second control signaling indicating the uplink control channel group for the CC.

In some examples, the timing component 1140 may be configured as or otherwise support a means for transmitting second control signaling indicating a timer or a counter associated with the set of multiple uplink control channel groups, where a first uplink control channel group of the set of multiple uplink control channel groups is associated with a duration of the timer or a value of the counter being less than or equal to threshold and a second uplink control channel group of the set of multiple uplink control channel groups is associated with expiration of the timer or the value of the counter being greater than the threshold, and where selecting the uplink control channel group for the CC is based on the timer or the counter.

In some examples, the timer or the counter is associated with a first quantity of slots for which the UE receives no data transmission on the CC or a second quantity of slots for which the UE receives no third control message scheduling a data transmission on the CC in the first uplink control channel group of the set of multiple uplink control channel groups.

In some examples, the set of multiple uplink control channel groups for the UE is associated with a set of multiple uplink control channel group configurations, and the uplink control channel group component 1135 may be configured as or otherwise support a means for transmitting second control signaling indicating a first uplink control channel group configuration of the set of multiple uplink control channel group configurations, where the uplink control channel group for the CC is based on the first uplink control channel group configuration.

In some examples, to support transmitting the second control signaling, the uplink control channel group component 1135 may be configured as or otherwise support a means for transmitting an indication of an index corresponding to the first uplink control channel group configuration, where the second control signaling includes the indication of the index.

In some examples, to support receiving the uplink control information for the CC, the uplink control information component 1130 may be configured as or otherwise support a means for receiving the uplink control information for the CC using a set of uplink shared channel resources, where the set of uplink shared channel resources overlap at least partially with the set of uplink control channel resources associated with the uplink control channel group.

In some examples, to support receiving the uplink control information for the CC, the uplink control information component 1130 may be configured as or otherwise support a means for receiving the uplink control information for the CC using the set of uplink control channel resources associated with the uplink control channel group.

In some examples, the uplink control information component 1130 may be configured as or otherwise support a means for receiving second uplink control information for a second CC in a second uplink control channel group.

In some examples, the uplink control channel group for the CC is different than the second uplink control channel group for the second CC.

In some examples, the uplink control channel group for the CC is the same as the second uplink control channel group for the second CC.

Figure 12:
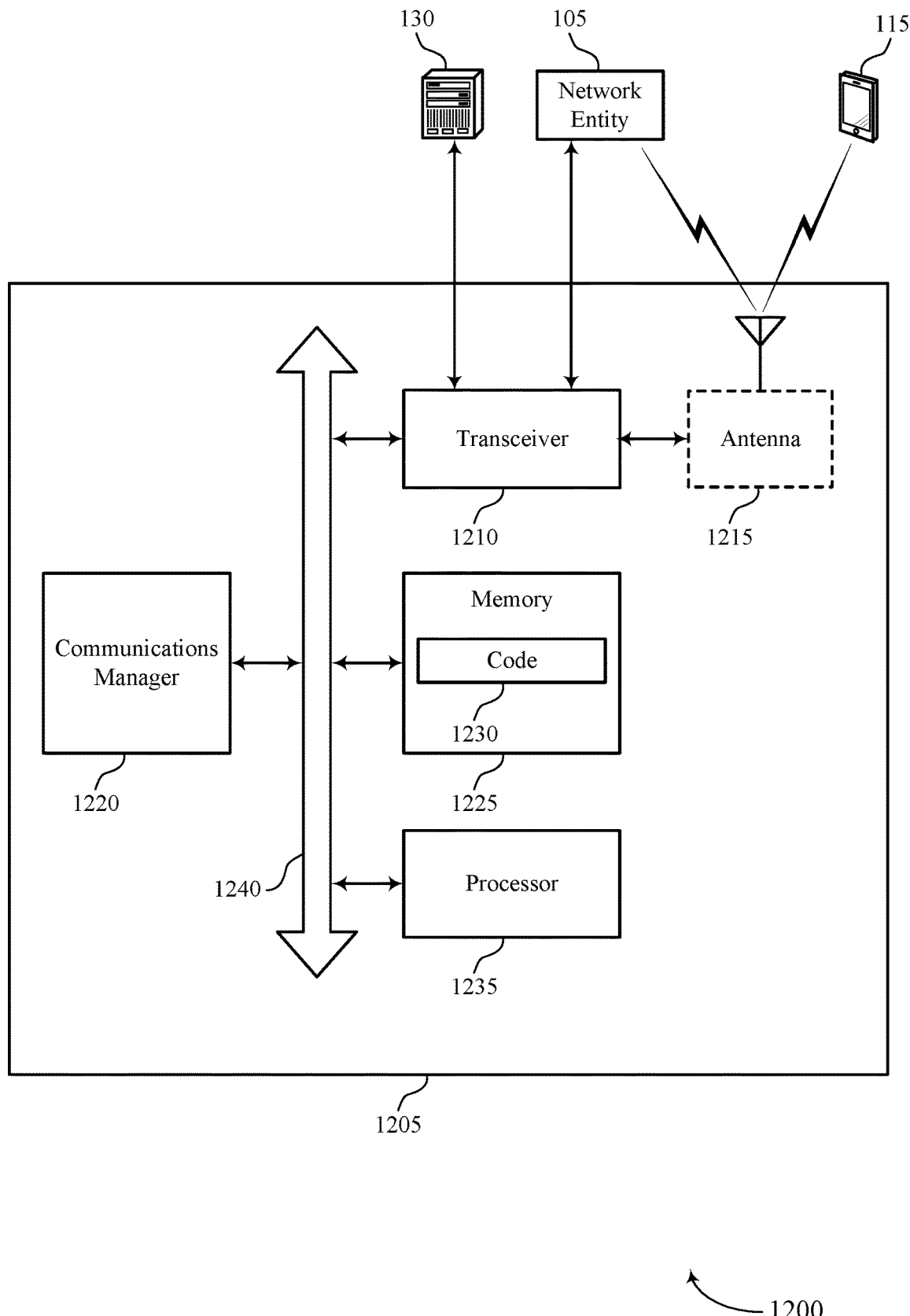
FIG. 12 shows a diagram of a system including a device that supports dynamic uplink control channel grouping in accordance with one or more aspects of the present disclosure.

FIG. 12 shows a diagram of a system 1200 including a device 1205 that supports dynamic uplink control channel grouping in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The at least one memory 1225 may include RAM and ROM. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., the memory 1225) to cause the device 1205 to perform various functions (e.g., functions or tasks supporting dynamic uplink control channel grouping). For example, the device 1205 or a component of the device 1205 may include at least one processor 1235 and at least one memory 1225 coupled with one or more of the at least one processor 1235, the at least one processor 1235 and at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within the memory 1225). In some implementations, the at least one processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the at least one processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting first control signaling indicating a set of multiple uplink control channel groups for a UE, where each uplink control channel group of the set of multiple uplink control channel groups is associated with a different set of uplink control channel resources. The communications manager 1220 may be configured as or otherwise support a means for receiving uplink control information for a CC in an uplink control channel group of the set of multiple uplink control channel groups.

By including or configuring the communications manager 1220 in accordance with examples as described herein, the device 1205 may support techniques for dynamic uplink control channel grouping which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the at least one processor 1235, the at least one memory 1225, the code 1230, or any combination thereof. For example, the code 1230 may include instructions executable by one or more of the at least one processor 1235 to cause the device 1205 to perform various aspects of dynamic uplink control channel grouping as described herein, or the at least one processor 1235 and the at least one memory 1225 may be otherwise configured to perform or support such operations.

Figure 13:
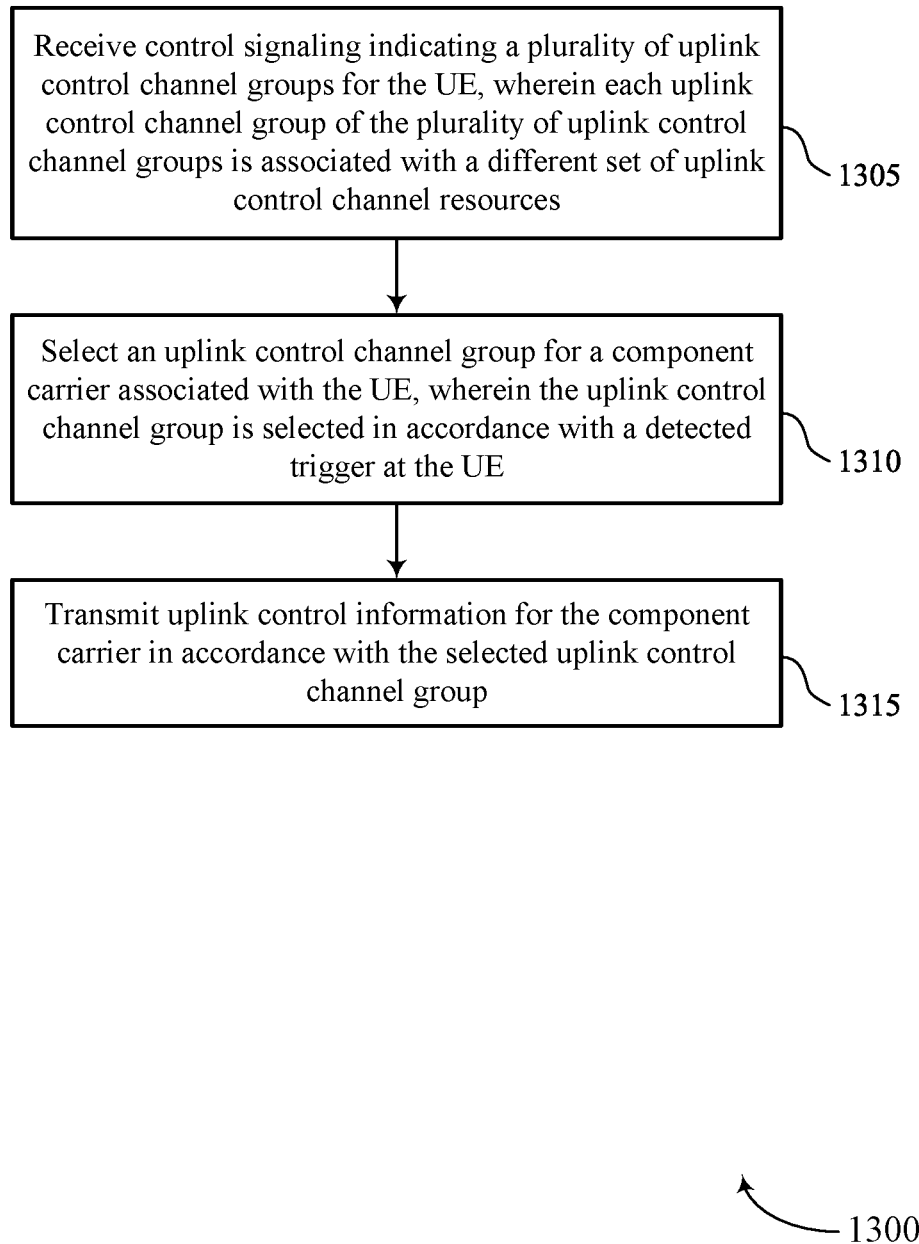
FIGS. 13 through 16 show flowcharts illustrating methods that support dynamic uplink control channel grouping in accordance with one or more aspects of the present disclosure.

FIG. 13 shows a flowchart illustrating a method 1300 that supports dynamic uplink control channel grouping in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control signaling indicating a set of multiple uplink control channel groups for the UE, where each uplink control channel group of the set of multiple uplink control channel groups is associated with a different set of uplink control channel resources. The operations of 1305 may be performed in accordance with examples as disclosed herein. In some examples, aspects of the operations of 1305 may be performed by a configuration component 725 as described with reference to FIG. 7.

At 1310, the method may include selecting an uplink control channel group for a CC associated with the UE, where the uplink control channel group is selected in accordance with a detected trigger at the UE. The operations of 1310 may be performed in accordance with examples as disclosed herein. In some examples, aspects of the operations of 1310 may be performed by an uplink control channel group component 730 as described with reference to FIG. 7.

At 1315, the method may include transmitting uplink control information for the CC in accordance with the selected uplink control channel group. The operations of 1315 may be performed in accordance with examples as disclosed herein. In some examples, aspects of the operations of 1315 may be performed by an uplink control information component 735 as described with reference to FIG. 7.

Figure 14:
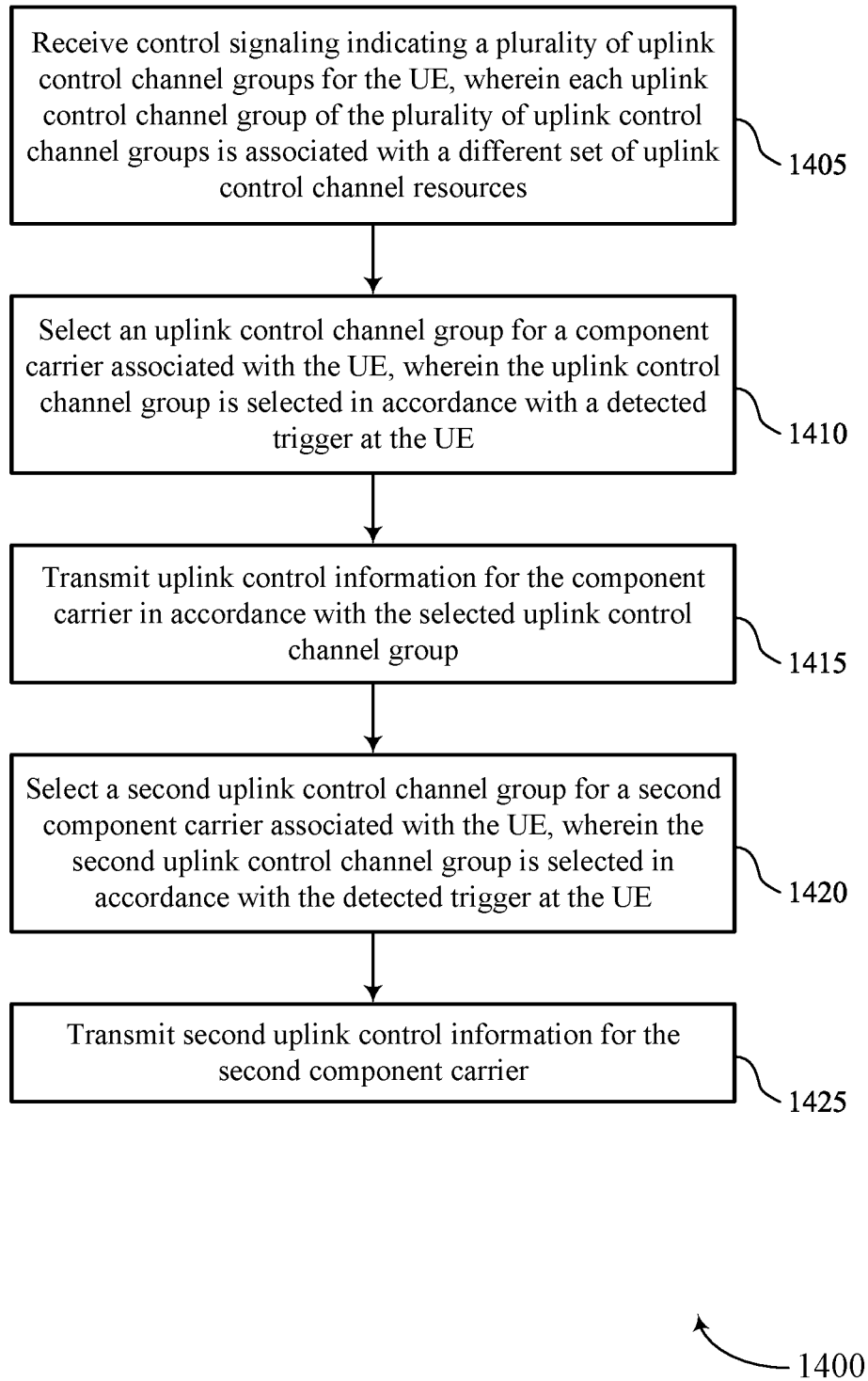

FIG. 14 shows a flowchart illustrating a method 1400 that supports dynamic uplink control channel grouping in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving control signaling indicating a set of multiple uplink control channel groups for the UE, where each uplink control channel group of the set of multiple uplink control channel groups is associated with a different set of uplink control channel resources. The operations of 1405 may be performed in accordance with examples as disclosed herein. In some examples, aspects of the operations of 1405 may be performed by a configuration component 725 as described with reference to FIG. 7.

At 1410, the method may include selecting an uplink control channel group for a CC associated with the UE, where the uplink control channel group is selected in accordance with a detected trigger at the UE. The operations of 1410 may be performed in accordance with examples as disclosed herein. In some examples, aspects of the operations of 1410 may be performed by an uplink control channel group component 730 as described with reference to FIG. 7.

At 1415, the method may include transmitting uplink control information for the CC in accordance with the selected uplink control channel group. The operations of 1415 may be performed in accordance with examples as disclosed herein. In some examples, aspects of the operations of 1415 may be performed by an uplink control information component 735 as described with reference to FIG. 7.

At 1420, the method may include selecting a second uplink control channel group for a second CC associated with the UE, where the second uplink control channel group is selected in accordance with the detected trigger at the UE. The operations of 1420 may be performed in accordance with examples as disclosed herein. In some examples, aspects of the operations of 1420 may be performed by an uplink control channel group component 730 as described with reference to FIG. 7.

At 1425, the method may include transmitting second uplink control information for the second CC. The operations of 1425 may be performed in accordance with examples as disclosed herein. In some examples, aspects of the operations of 1425 may be performed by an uplink control information component 735 as described with reference to FIG. 7.

Figure 15:
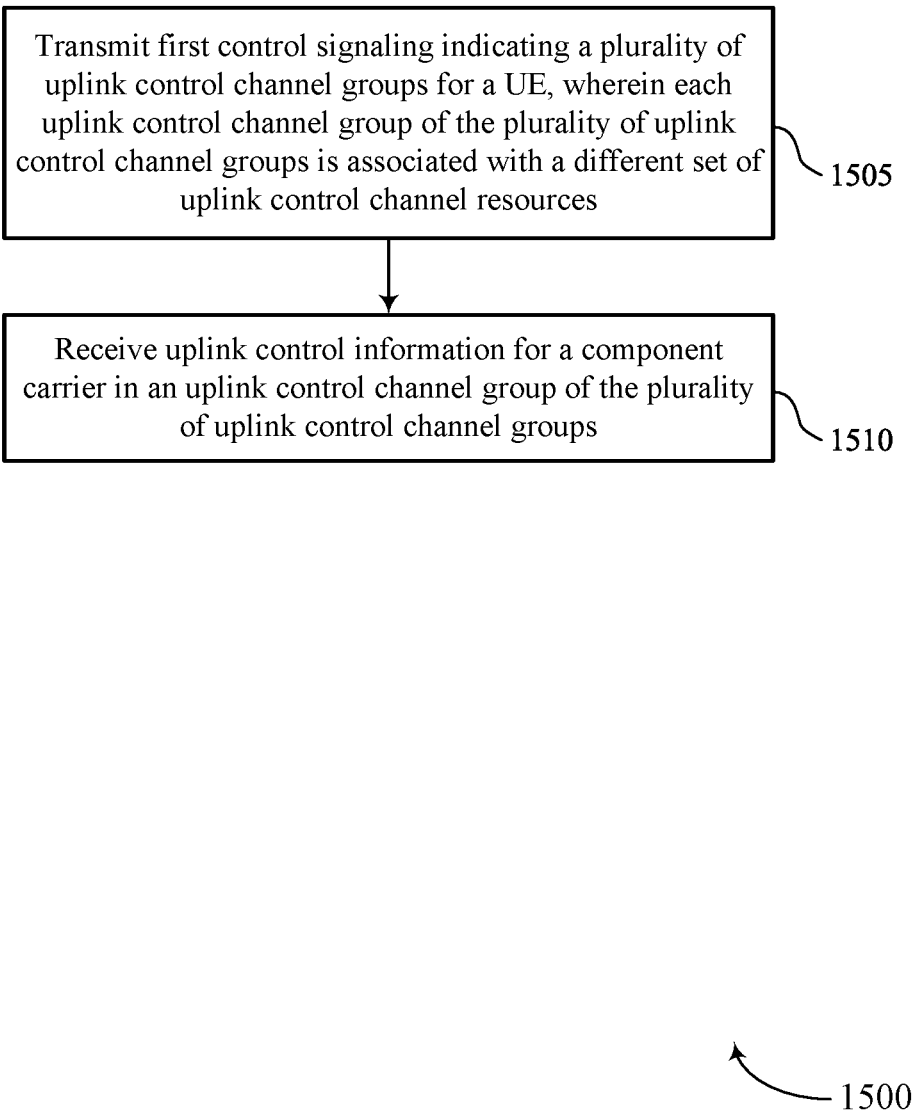

FIG. 15 shows a flowchart illustrating a method 1500 that supports dynamic uplink control channel grouping in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting first control signaling indicating a set of multiple uplink control channel groups for a UE, where each uplink control channel group of the set of multiple uplink control channel groups is associated with a different set of uplink control channel resources. The operations of 1505 may be performed in accordance with examples as disclosed herein. In some examples, aspects of the operations of 1505 may be performed by a configuration component 1125 as described with reference to FIG. 11.

At 1510, the method may include receiving uplink control information for a CC in an uplink control channel group of the set of multiple uplink control channel groups. The operations of 1510 may be performed in accordance with examples as disclosed herein. In some examples, aspects of the operations of 1510 may be performed by an uplink control information component 1130 as described with reference to FIG. 11.

Figure 16:
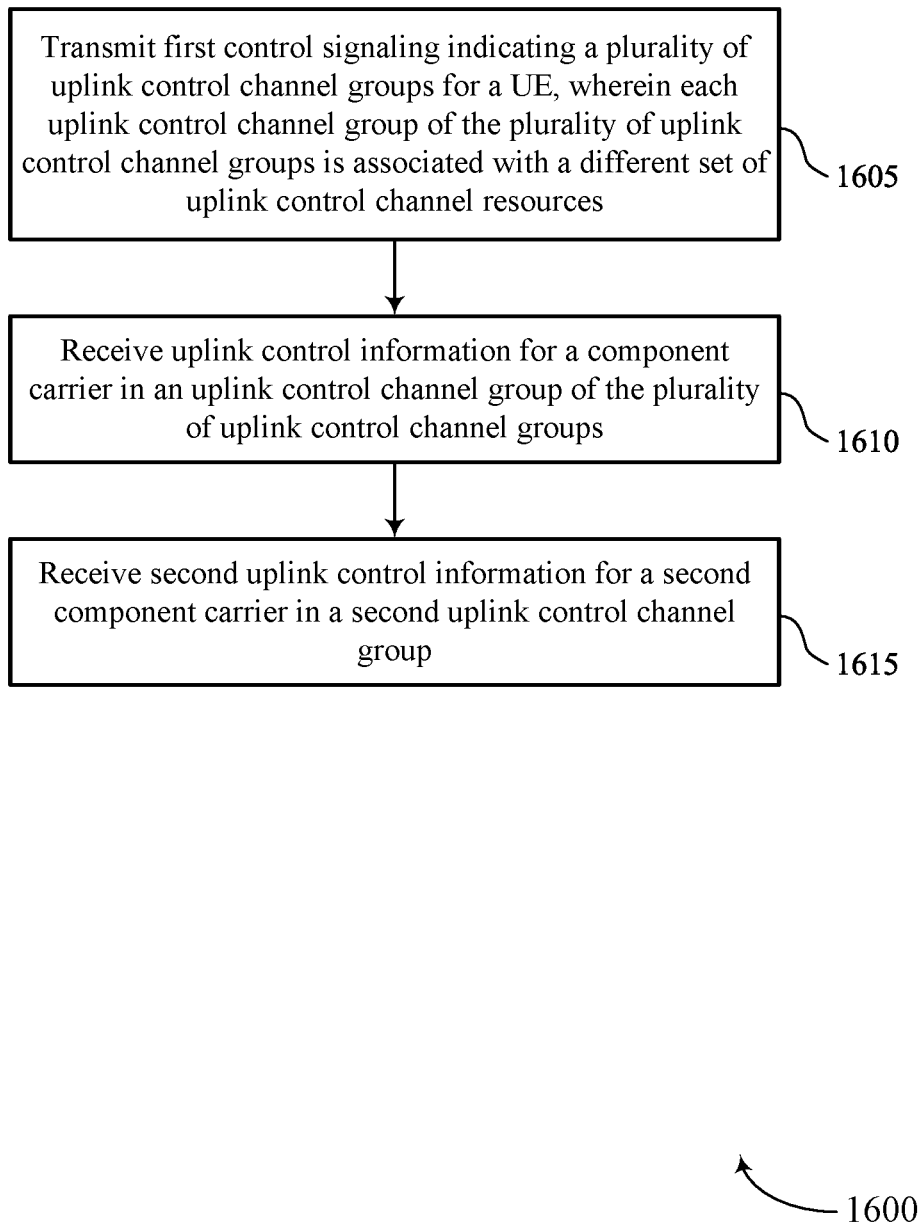

FIG. 16 shows a flowchart illustrating a method 1600 that supports dynamic uplink control channel grouping in accordance with one or more aspects of the present disclosure.

The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting first control signaling indicating a set of multiple uplink control channel groups for a UE, where each uplink control channel group of the set of multiple uplink control channel groups is associated with a different set of uplink control channel resources. The operations of 1605 may be performed in accordance with examples as disclosed herein. In some examples, aspects of the operations of 1605 may be performed by a configuration component 1125 as described with reference to FIG. 11.

At 1610, the method may include receiving uplink control information for a CC in an uplink control channel group of the set of multiple uplink control channel groups. The operations of 1610 may be performed in accordance with examples as disclosed herein. In some examples, aspects of the operations of 1610 may be performed by an uplink control information component 1130 as described with reference to FIG. 11.

At 1615, the method may include receiving second uplink control information for a second CC in a second uplink control channel group. The operations of 1615 may be performed in accordance with examples as disclosed herein. In some examples, aspects of the operations of 1615 may be performed by an uplink control information component 1130 as described with reference to FIG. 11.

The following provides an overview of aspects of the present disclosure:

Aspect 1: A method for wireless communications at a UE, comprising: receiving control signaling indicating a plurality of uplink control channel groups for the UE, wherein each uplink control channel group of the plurality of uplink control channel groups is associated with a different set of uplink control channel resources; selecting an uplink control channel group for a CC associated with the UE, wherein the uplink control channel group is selected in accordance with a detected trigger at the UE; and transmitting UCI for the CC in accordance with the selected uplink control channel group.

Aspect 2: The method of aspect 1, further comprising: receiving second control signaling indicating the uplink control channel group for the CC associated with the UE, wherein the detected trigger is based at least in part on the second control signaling.

Aspect 3: The method of aspect 2, wherein selecting the uplink control channel group for the CC comprises: selecting the uplink control channel group for the CC based at least in part on a time offset wherein the time offset is based at least in part on transmitting feedback information associated with the second control signaling.

Aspect 4: The method of any of aspects 1 through 3, further comprising: receiving second control signaling indicating a timer or a counter associated with the plurality of uplink control channel groups, wherein a first uplink control channel group of the plurality of uplink control channel groups is associated with a duration of the timer or a value of the counter being less than or equal to threshold and a second uplink control channel group of the plurality of uplink control channel groups is associated with expiration of the timer or the value of the counter being greater than the threshold, and wherein selecting the uplink control channel group for the CC is based at least in part on the timer or the counter.

Aspect 5: The method of aspect 4, wherein the timer or the counter is associated with a first quantity of slots for which the UE receives no data transmission on the CC or a second quantity of slots for which the UE receives no third control message scheduling a data transmission on the CC in the first uplink control channel group of the plurality of uplink control channel groups.

Aspect 6: The method of any of aspects 1, 4, and 5, wherein the plurality of uplink control channel groups for the UE is associated with a plurality of uplink control channel group configurations, the method further comprising: receiving second control signaling indicating a first uplink control channel group configuration of the plurality of uplink control channel group configurations, wherein the uplink control channel group for the CC is based at least in part on the first uplink control channel group configuration, and wherein the detected trigger is based at least in part on the second control signaling.

Aspect 7: The method of aspect 6, wherein receiving the second control signaling comprises: receiving an indication of an index corresponding to the first uplink control channel group configuration, wherein the second control signaling comprises the indication of the index.

Aspect 8: The method of any of aspects 6 through 7, wherein selecting the uplink control channel group for the CC comprises: selecting the uplink control channel group for the CC based at least in part on a time offset, wherein the time offset is based at least in part on receiving the second control signaling or transmitting feedback information associated with the second control signaling.

Aspect 9: The method of aspect 1, wherein selecting the uplink control channel group for the CC comprises: selecting the uplink control channel group for the CC based at least in part on a type of scheduling associated with the CC, wherein the detected trigger is associated with the type of scheduling.

Aspect 10: The method of aspect 9, wherein a first uplink control channel group of the plurality of uplink control channel groups is associated with a first type of scheduling and a second uplink control channel group of the plurality of uplink control channel groups is associated with a second type of scheduling.

Aspect 11: The method of aspect 10, wherein the first type of scheduling corresponds to at least one of multi-cell scheduling or cross-carrier scheduling and the second type of scheduling corresponds to single-cell scheduling.

Aspect 12: The method of any of aspects 1 through 11, wherein transmitting the UCI for the CC comprises: transmitting the UCI for the CC using the set of uplink control channel resources associated with the selected uplink control channel group.

Aspect 13: The method of any of aspects 1 through 11, wherein transmitting the UCI for the CC comprises: multiplexing the UCI on a set of uplink shared channel resources, wherein the set of uplink shared channel resources overlap at least partially with the set of uplink control channel resources associated with the selected uplink control channel group.

Aspect 14: The method of any of aspects 1 through 13, further comprising: selecting a second uplink control channel group for a second CC associated with the UE, wherein the second uplink control channel group is selected in accordance with the detected trigger at the UE; and transmitting second UCI for the second CC.

Aspect 15: The method of aspect 14, wherein the uplink control channel group for the CC is different than the second uplink control channel group for the second CC.

Aspect 16: The method of aspect 14, wherein the uplink control channel group for the CC is the same as the second uplink control channel group for the second CC.

Aspect 17: A method for wireless communications at a network entity, comprising: transmitting first control signaling indicating a plurality of uplink control channel groups for a UE, wherein each uplink control channel group of the plurality of uplink control channel groups is associated with a different set of uplink control channel resources; and receiving UCI for a CC in an uplink control channel group of the plurality of uplink control channel groups.

Aspect 18: The method of aspect 17, further comprising: transmitting second control signaling indicating the uplink control channel group for the CC.

Aspect 19: The method of any of aspects 17 through 18, further comprising: transmitting second control signaling indicating a timer or a counter associated with the plurality of uplink control channel groups, wherein a first uplink control channel group of the plurality of uplink control channel groups is associated with a duration of the timer or a value of the counter being less than or equal to threshold and a second uplink control channel group of the plurality of uplink control channel groups is associated with expiration of the timer or the value of the counter being greater than the threshold, and wherein selecting the uplink control channel group for the CC is based at least in part on the timer or the counter.

Aspect 20: The method of aspect 19, wherein the timer or the counter is associated with a first quantity of slots for which the UE receives no data transmission on the CC or a second quantity of slots for which the UE receives no third control message scheduling a data transmission on the CC in the first uplink control channel group of the plurality of uplink control channel groups.

Aspect 21: The method of any of aspects 17, 19, and 20, wherein the plurality of uplink control channel groups for the UE is associated with a plurality of uplink control channel group configurations, the method further comprising: transmitting second control signaling indicating a first uplink control channel group configuration of the plurality of uplink control channel group configurations, wherein the uplink control channel group for the CC is based at least in part on the first uplink control channel group configuration.

Aspect 22: The method of aspect 21, wherein transmitting the second control signaling comprises: transmitting an indication of an index corresponding to the first uplink control channel group configuration, wherein the second control signaling comprises the indication of the index.

Aspect 23: The method of any of aspects 17 through 22, wherein receiving the UCI for the CC comprises: receiving the UCI for the CC using a set of uplink shared channel resources, wherein the set of uplink shared channel resources overlap at least partially with the set of uplink control channel resources associated with the uplink control channel group.

Aspect 24: The method of any of aspects 17 through 22, wherein receiving the UCI for the CC comprises: receiving the UCI for the CC using the set of uplink control channel resources associated with the uplink control channel group.

Aspect 25: The method of any of aspects 17 through 24, further comprising: receiving second UCI for a second CC in a second uplink control channel group.

Aspect 26: The method of aspect 25, wherein the uplink control channel group for the CC is different than the second uplink control channel group for the second CC.

Aspect 27: The method of aspect 25, wherein the uplink control channel group for the CC is the same as the second uplink control channel group for the second CC.

Aspect 28: A UE, comprising one or more memories storing processor-executable code; and one or more processors coupled with the one or more memories and individually or collectively operable to execute the code to cause the UE to perform a method of any of aspects 1 through 16.

Aspect 29: An apparatus for wireless communications at a UE, comprising at least one means for performing a method of any of aspects 1 through 16.

Aspect 30: A non-transitory computer-readable medium storing code for wireless communications at a UE, the code comprising instructions executable by one or more processors to perform a method of any of aspects 1 through 16.

Aspect 31: A network entity, comprising one or more memories storing processor-executable code; and one or more processors coupled with the one or more memories and individually or collectively operable to execute the code to cause the network entity to perform a method of any of aspects 17 through 27.

Aspect 32: An apparatus for wireless communications at a network entity, comprising at least one means for performing a method of any of aspects 17 through 27.

Aspect 33: A non-transitory computer-readable medium storing code for wireless communications at a network entity, the code comprising instructions executable by one or more processors to perform a method of any of aspects 17 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive control signaling indicating a plurality of uplink control channel groups for the UE, wherein each uplink control channel group of the plurality of uplink control channel groups is associated with a different set of uplink control channel resources;
select an uplink control channel group for a component carrier associated with the UE, wherein the uplink control channel group is selected in accordance with a detected trigger at the UE; and
transmit uplink control information for the component carrier in accordance with the selected uplink control channel group.

2. The UE of claim 1, wherein the one or more processors are individually or collectively further operable to execute the code to cause the UE to:
receive second control signaling indicating the uplink control channel group for the component carrier associated with the UE, wherein the detected trigger is based at least in part on the second control signaling.

3. The UE of claim 2, wherein, to select the uplink control channel group for the component carrier, the one or more processors are individually or collectively operable to execute the code to cause the UE to:

select the uplink control channel group for the component carrier based at least in part on a time offset, wherein the time offset is based at least in part on transmitting feedback information associated with the second control signaling.

4. The UE of claim 1, wherein the one or more processors are individually or collectively further operable to execute the code to cause the UE to:
receive second control signaling indicating a timer or a counter associated with the plurality of uplink control channel groups, wherein a first uplink control channel group of the plurality of uplink control channel groups is associated with a duration of the timer or a value of the counter being less than or equal to threshold and a second uplink control channel group of the plurality of uplink control channel groups is associated with expiration of the timer or the value of the counter being greater than the threshold, and wherein selecting the uplink control channel group for the component carrier is based at least in part on the timer or the counter.

5. The UE of claim 4, wherein the timer or the counter is associated with a first quantity of slots for which the UE receives no data transmission on the component carrier or a second quantity of slots for which the UE receives no third control message scheduling a data transmission on the component carrier in the first uplink control channel group of the plurality of uplink control channel groups.

6. The UE of claim 1, wherein the plurality of uplink control channel groups for the UE is associated with a plurality of uplink control channel group configurations, and the one or more processors are individually or collectively operable to execute the code to cause the UE to:
receive second control signaling indicating a first uplink control channel group configuration of the plurality of uplink control channel group configurations, wherein the uplink control channel group for the component carrier is based at least in part on the first uplink control channel group configuration, and wherein the detected trigger is based at least in part on the second control signaling.

7. The UE of claim 6, wherein, to receive the second control signaling, the one or more processors are individually or collectively operable to execute the code to cause the UE to:
receive an indication of an index corresponding to the first uplink control channel group configuration, wherein the second control signaling comprises the indication of the index.

8. The UE of claim 6, wherein, to select the uplink control channel group for the component carrier, the one or more processors are individually or collectively operable to execute the code to cause the UE to:
select the uplink control channel group for the component carrier based at least in part on a time offset, wherein the time offset is based at least in part on receiving the second control signaling or transmitting feedback information associated with the second control signaling.

9. The UE of claim 1, wherein, to select the uplink control channel group for the component carrier, the one or more processors are individually or collectively operable to execute the code to cause the UE to:
select the uplink control channel group for the component carrier based at least in part on a type of scheduling associated with the component carrier, wherein the detected trigger is associated with the type of scheduling.

10. The UE of claim 9, wherein a first uplink control channel group of the plurality of uplink control channel groups is associated with a first type of scheduling and a second uplink control channel group of the plurality of uplink control channel groups is associated with a second type of scheduling.

11. The UE of claim 10, wherein the first type of scheduling corresponds to at least one of multi-cell scheduling or cross-carrier scheduling and the second type of scheduling corresponds to single-cell scheduling.

12. The UE of claim 1, wherein, to transmit the uplink control information for the component carrier, the one or more processors are individually or collectively operable to execute the code to cause the UE to:
transmit the uplink control information for the component carrier using the set of uplink control channel resources associated with the selected uplink control channel group.

13. The UE of claim 1, wherein, to transmit the uplink control information for the component carrier, the one or more processors are individually or collectively operable to execute the code to cause the UE to:
multiplex the uplink control information on a set of uplink shared channel resources, wherein the set of uplink shared channel resources overlap at least partially with the set of uplink control channel resources associated with the selected uplink control channel group.

14. The UE of claim 1, wherein the one or more processors are individually or collectively further operable to execute the code to cause the UE to:
select a second uplink control channel group for a second component carrier associated with the UE, wherein the second uplink control channel group is selected in accordance with the detected trigger at the UE; and
transmit second uplink control information for the second component carrier.

15. The UE of claim 14, wherein the uplink control channel group for the component carrier is different than the second uplink control channel group for the second component carrier.

16. The UE of claim 14, wherein the uplink control channel group for the component carrier is the same as the second uplink control channel group for the second component carrier.

17. A network entity, comprising:
one or more memories storing processor-executable code; and
one or more processors coupled with the one or more memories and individually or collectively operable to execute the code to cause the network entity to:
transmit first control signaling indicating a plurality of uplink control channel groups for a user equipment (UE), wherein each uplink control channel group of the plurality of uplink control channel groups is associated with a different set of uplink control channel resources; and
receive uplink control information for a component carrier in an uplink control channel group of the plurality of uplink control channel groups.

18. The network entity of claim 17, wherein the one or more processors are individually or collectively further operable to execute the code to cause the network entity to:
transmit second control signaling indicating the uplink control channel group for the component carrier.

19. The network entity of claim 17, wherein the one or more processors are individually or collectively further operable to execute the code to cause the network entity to:

transmit second control signaling indicating a timer or a counter associated with the plurality of uplink control channel groups, wherein a first uplink control channel group of the plurality of uplink control channel groups is associated with a duration of the timer or a value of the counter being less than or equal to threshold and a second uplink control channel group of the plurality of uplink control channel groups is associated with expiration of the timer or the value of the counter being greater than the threshold, and wherein selecting the uplink control channel group for the component carrier is based at least in part on the timer or the counter.

20. The network entity of claim 19, wherein the timer or the counter is associated with a first quantity of slots for which the UE receives no data transmission on the component carrier or a second quantity of slots for which the UE receives no third control message scheduling a data transmission on the component carrier in the first uplink control channel group of the plurality of uplink control channel groups.

21. The network entity of claim 17, wherein the plurality of uplink control channel groups for the UE is associated with a plurality of uplink control channel group configurations, and the one or more processors are individually or collectively operable to execute the code to cause the network entity to:
transmit second control signaling indicating a first uplink control channel group configuration of the plurality of uplink control channel group configurations, wherein the uplink control channel group for the component carrier is based at least in part on the first uplink control channel group configuration.

22. The network entity of claim 21, wherein, to transmit the second control signaling, the one or more processors are individually or collectively operable to execute the code to cause the network entity to:
transmit an indication of an index corresponding to the first uplink control channel group configuration, wherein the second control signaling comprises the indication of the index.

23. The network entity of claim 17, wherein, to receive the uplink control information for the component carrier, the one or more processors are individually or collectively operable to execute the code to cause the network entity to:
receive the uplink control information for the component carrier using a set of uplink shared channel resources, wherein the set of uplink shared channel resources overlap at least partially with the set of uplink control channel resources associated with the uplink control channel group.

24. The network entity of claim 17, wherein, to receive the uplink control information for the component carrier, the one or more processors are individually or collectively operable to execute the code to cause the network entity to:
receive the uplink control information for the component carrier using the set of uplink control channel resources associated with the uplink control channel group.

25. The network entity of claim 17, wherein the one or more processors are individually or collectively further operable to execute the code to cause the network entity to:
receive second uplink control information for a second component carrier in a second uplink control channel group.

26. The network entity of claim 25, wherein the uplink control channel group for the component carrier is different than the second uplink control channel group for the second component carrier, or the uplink control channel group for the component carrier is the same as the second uplink control channel group for the second component carrier.

27. A method for wireless communications at a user equipment (UE), comprising:
receiving control signaling indicating a plurality of uplink control channel groups for the UE, wherein each uplink control channel group of the plurality of uplink control channel groups is associated with a different set of uplink control channel resources;
selecting an uplink control channel group for a component carrier associated with the UE, wherein the uplink control channel group is selected in accordance with a detected trigger at the UE; and
transmitting uplink control information for the component carrier in accordance with the selected uplink control channel group.

28. The method of claim 27, further comprising:
receiving second control signaling indicating the uplink control channel group for the component carrier associated with the UE, wherein the detected trigger is based at least in part on the second control signaling.

29. A method for wireless communications at a network entity, comprising:
transmitting first control signaling indicating a plurality of uplink control channel groups for a user equipment (UE), wherein each uplink control channel group of the plurality of uplink control channel groups is associated with a different set of uplink control channel resources; and
receiving uplink control information for a component carrier in an uplink control channel group of the plurality of uplink control channel groups.

30. The method of claim 29, further comprising:
transmitting second control signaling indicating the uplink control channel group for the component carrier.

* * * * *